(12) United States Patent
Hayaishi

(10) Patent No.: US 7,532,239 B2
(45) Date of Patent: May 12, 2009

(54) AUTOMATIC ADJUSTMENT OF IMAGE QUALITY ACCORDING TO TYPE OF LIGHT SOURCE

(75) Inventor: Ikuo Hayaishi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 538 days.

(21) Appl. No.: 10/527,285

(22) PCT Filed: Oct. 2, 2003

(86) PCT No.: PCT/JP03/12684

§ 371 (c)(1),
(2), (4) Date: Mar. 8, 2005

(87) PCT Pub. No.: WO2004/034711

PCT Pub. Date: Apr. 22, 2004

(65) Prior Publication Data

US 2005/0243186 A1    Nov. 3, 2005

(30) Foreign Application Priority Data

Oct. 11, 2002   (JP) ............................. 2002-299432

(51) Int. Cl.
*H04N 9/73*   (2006.01)
(52) U.S. Cl. .................. 348/223.1; 348/231.6
(58) Field of Classification Search .............. 382/167, 382/162, 313, 169, 274, 168; 348/222.1, 348/223.1, 227.1, 228.1, 237, 231.3, 371, 348/370, 234, 592, 366, 365, 364, 362, 297, 348/277, 254, 255, 229.1, 226.1, 225.1, 224.1, 348/231.99, 221.1; 358/516, 518, 448

See application file for complete search history.

(56) References Cited

U.S. PATENT DOCUMENTS 6,823,083 B1 *   11/2004   Watanabe et al. ........... 382/167

(Continued)

FOREIGN PATENT DOCUMENTS

JP         10-271524         10/1998

(Continued)

OTHER PUBLICATIONS

English Machine Translation of JP 2001-115788 A (Application Published on Apr. 21, 2000).*

(Continued)

*Primary Examiner*—Nhan T. Tran
*Assistant Examiner*—Nelson D Hernández Hernández
(74) *Attorney, Agent, or Firm*—Martine Penilla & Gencarella, LLP

(57) ABSTRACT

There is provided an output device for outputting an image using image data generated by an image generating device, and image generation record information that is associated with the image data and that includes at least information relating to shooting conditions at the time of generation of the image data, comprising an image quality adjuster that, in the event that the image generation record information contains light source information relating to color shift of a light source at the time of generation of the image data, is able to execute the white balance adjustment process of the image data on the basis of the color of the light source obtained using the light source information; and an image output unit for outputting an image according to the image quality-adjusted image data.

8 Claims, 17 Drawing Sheets

U.S. PATENT DOCUMENTS

| | | | |
|---|---|---|---|
| 7,327,391 B2 * | 2/2008 | Fujino | 348/230.1 |
| 2002/0135687 A1 * | 9/2002 | Nakajima et al. | 348/231.3 |
| 2003/0035159 A1 | 2/2003 | Nakami | |

FOREIGN PATENT DOCUMENTS

| | | |
|---|---|---|
| JP | 11-127442 | 5/1999 |
| JP | 2000-115788 | 4/2000 |
| JP | 2000-299801 | 10/2000 |
| JP | 2001-177733 | 6/2001 |
| JP | 2001-339739 | 12/2001 |
| JP | 2002-218480 | 8/2002 |
| WO | WO 02/065756 | 8/2002 |

OTHER PUBLICATIONS

English Machine Translation of JP 2001-339739 A (Application Published on Dec. 7, 2001).*

English Machine Translation of JP 2001-177733 A (Application Published on Jun. 29, 2001).*

Abstract of Japanese Patent Publication No. JP 10-271524, Pub. Date: Oct. 9, 1998, Patent Abstracts of Japan.

Abstract of Japanese Patent Publication No. JP 2000-299801, Pub. Date: Oct. 24, 2000, Patent Abstracts of Japan.

Abstract of Japanese Patent Publication No. JP 11-127442, Pub. Date: May 11, 1999, Patent Abstracts of Japan.

Abstract of Japanese Patent Publication No. JP 2000-115788, Pub. Date: Apr. 21, 2000, Patent Abstracts of Japan.

Abstract of Japanese Patent Publication No. JP 2001-177733, Pub. Date: Jun. 29, 2001, Patent Abstracts of Japan.

Abstract of Japanese Patent Publication No. JP 2001-339739, Pub. Date: Dec. 7, 2001, Patent Abstracts of Japan.

Abstract of Japanese Patent Publication No. JP 2002-218480, Pub. Date: Aug. 2, 2002, Patent Abstracts of Japan.

* cited by examiner

Fig.5

| Tag name | Parameter value |
|---|---|
| Light source | tungsten |
| White balance | Auto Set |
| Aperture value | F4 |
| Shutter speed | 1/60(sec) |

| Light source | Light source color |
|---|---|
| Daylight | white |
| Fluorescent | blue-green |
| Tungsten | orange |
| Flash | white |
| Clear | yellow |
| Cloudy | pale blue |
| Shade | blue |

Example of selection conditions for
color cast calculation pixel group used in
standard white balance adjustment process Example of selection conditions for color cast calculation pixels where light source type is tungsten Example of adjustment of processing
amount proportion k where
light source type is tungsten (Have: hue calculated from Rave, Gave, Bave)

AUTOMATIC ADJUSTMENT OF IMAGE QUALITY ACCORDING TO TYPE OF LIGHT SOURCE

TECHNICAL FIELD

The present invention relates to an image quality adjustment technique for adjusting image quality of image data.

BACKGROUND ART

Image quality of image data generated by a digital still camera (DSC), digital video camera (DVC) or the like can be adjusted in a desired manner using an image retouching application run on a personal computer. An image retouching application typically has an image quality adjusting function for automatically adjusting image quality of image data; using this image quality adjusting function, image quality of an image output from an output device can be improved. CRTs, LCDs, printers, projectors, and television receivers, for example, are known image output devices.

A printer driver, which controls the operation of a printer as an output device, also has a function for automatically adjusting image quality, and the quality of printed images can be improved using such a printer driver as well.

One important factor determining image quality of print data is color balance. Color balance of image data is strongly affected by the light source used when the image data was generated. Light sources include natural light sources such as sunlight, artificial light sources such as fluorescent and incandescent lighting, depending on the shooting location or time or shooting, or selected according to user preference. Additionally, the spectral distribution of light differs depending on the type of light source. Thus, for a given subject, images having shifted color balance (color cast) may occur under light sources of different types. For example, where a light source that contains strong blue light (such as fluorescent lighting) is used, images may have a bluish cast. Adjustment for such shift in color is termed "white balance". Where there is a significant color shift, a shift in color balance will be noticeable as well. Thus, there is employed a method of carrying out adjustment of white balance in such a way as to minimize color shift in image data, in order to improve image quality (see, for example, JP10-271524A and JP2000-299801A).

White balance adjustment is executed in such a way as to minimize color cast in image data across the board. However, in some instances color cast in image data can vary in a number of ways, depending on color of a certain subject, for example.

Thus, there were some instances in which image quality may not be improved sufficiently despite carrying out white balance adjustment in the conventional manner. Such problems are not limited to images created by DSCs, but are common to images created by DVCs and other such image generating devices as well.

With the foregoing in view, it is an object of the present invention to provide appropriate automatic adjustment of image quality depending on shift in color of the light source.

DISCLOSURE OF THE INVENTION

To address the aforementioned problems at least in part, the output device according to this invention is an output device for outputting images using image data generated by an image generating device and image generation record information that is associated with the image data, and that includes at least information relating to shooting conditions at the time of generation of the image data, wherein the output device comprises an image quality adjuster that, in the event that the image generation record information contains light source information relating to color shift of the light source at the time of generation of the image data, is able to execute a white balance adjustment process on the image data on the basis of the color of the light source obtained using the light source information; and an image output unit for outputting an image according to the image quality-adjusted image data.

According to the output device of this invention, since it is possible to execute a white balance adjustment process on the basis of light source color, image quality can be adjusted appropriately depending on color shift of the light source.

In preferred practice, in the aforementioned output device the image quality adjuster may adjust the magnitude of the white balance adjustment process on the basis of hue of the light source.

By so doing, since the magnitude of the white balance adjustment process is adjusted on the basis of the hue of the light source, image quality can be adjusted appropriately depending on the color of the light source.

In preferred practice, in the aforementioned output devices, the white balance adjustment process may include (i) a process of analyzing pixel values of a part of pixels making up the image data to determine an amount of color cast indicating deviation of hue of the image data from gray; (ii) a process of determining an amount of the white balance adjustment process based on the amount of color cast; and (iii) a process of executing the white balance adjustment process in accordance with the determined processing amount; wherein the magnitude of the white balance adjustment process is adjusted by means of adjusting, on the basis of the hue of the light source, a predetermined processing parameter used in at least one of the processes (i) and (ii).

By so doing, since a white balance adjustment process is carried out on the basis of the hue of the light source, image quality can be adjusted appropriately depending on the hue of the light source. Additionally, the magnitude of the white balance adjustment process can be adjusted readily.

In preferred practice, in the aforementioned output devices, the image quality adjuster may establish, as a condition for selecting certain pixels for analysis from among all of the pixels that make up the image data, a condition whereby pixels having a higher saturation value are selected for analysis as a pixel hue comes closer to the hue of the light source, in order to adjust the magnitude of the white balance adjustment process.

By so doing, since pixels having a higher saturation value are selected for use in calculating color cast as the pixel hue comes closer to the hue of the light source, a more intense white balance adjustment process can be executed in the event that the color balance of image data is shifted towards the hue of the light source.

In preferred practice, in the aforementioned output devices, the image quality adjuster may subject a process parameter representing a proportion of the amount of the white balance adjustment process to the amount of the color cast, to adjustment in such a way that the parameter is greater the closer the hue of the light source is to the shifted hue in the image data, in order to adjust the magnitude of the white balance adjustment process.

By so doing, since the proportion of the amount of the white balance adjustment process to the amount of color cast is greater the closer the hue of the light source is to the shifted hue in image data, a more intense white balance adjustment process can be executed in the event that the hue of image data is shifted towards the hue of the light source.

In preferred practice, in the aforementioned output devices, the image quality adjuster may select for the analysis pixels approximating achromatic color in the image data.

By so doing, since the amount of color cast is determined on the basis of areas approximating achromatic color, the effect on the white balance adjustment process of areas far off from achromatic color can be minimized.

In preferred practice, in the aforementioned output devices, the image quality adjuster may select for the analysis pixels excluding pixels of predetermined hue.

By so doing, since the amount of color cast is determined without the use of pixels of predetermined hue, the effect on the white balance adjustment process of pixels of predetermined hue can be minimized.

In preferred practice, in the aforementioned output devices, the image quality adjuster is able to determine whether the color balance of the image data was adjusted according to user instruction at the time of generation of the image data, and if determined to have been adjusted according to user instruction, executes the white balance adjustment process using a lower magnitude than if the determination had not been made.

By so doing, appreciable modification of the color balance of image data adjusted according to user instruction can be avoided.

This invention may be realized in various modes, for example, an image output method and image output device; an image data processing method (image processing method) and image data processing device (image processing device); a computer program for realizing functions of such a method or device; a storage medium having such a computer program stored thereon; and a data signal embodied in a carrier wave containing such a computer program.

BRIEF DESCRIPTION OF THE DRAWINGS

FIG. 5 is a diagram showing an example of data structure in an Exif data field.

FIG. 6 is a diagram showing correspondence relationships between light source type and light source color.

BEST MODE FOR CARRYING OUT THE INVENTION

The embodiments of the invention are described hereinbelow through examples in the following order.
   A. Arrangement of Image Output System:
   B. Arrangement of Image Generating Device:
   C. Arrangement of Image File:
   D. Arrangement of Image Output Device:
   E. Image Processing:
   F. Arrangement of Image Output System Using Image Data Processing Device:
   G. Variations:

A. Arrangement of Image Output System

Figure 1:
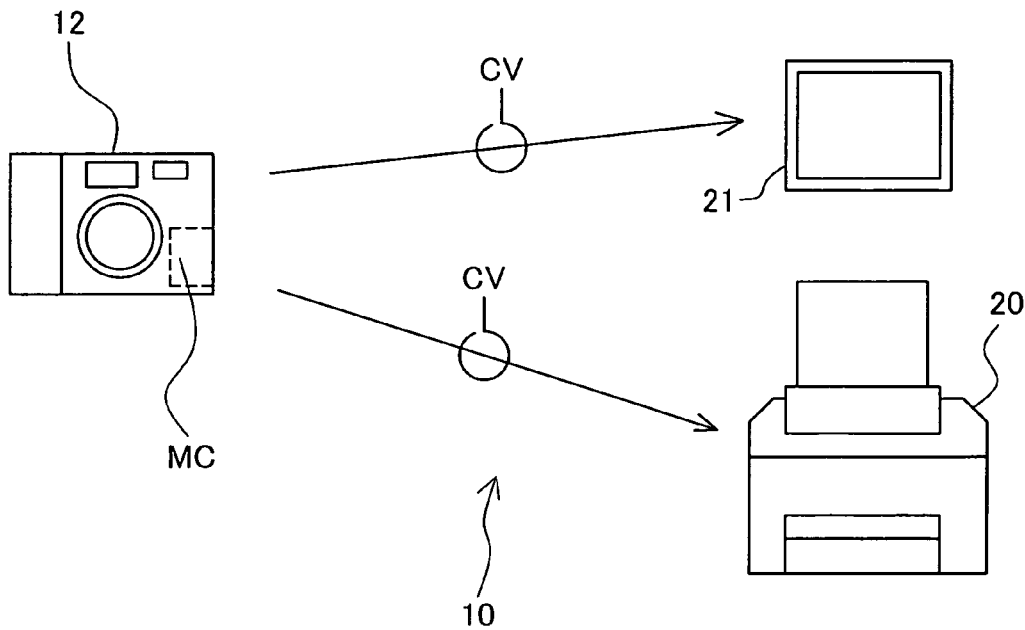
FIG. 1. is a diagram showing an example of an image output system.

FIG. 1 is a diagram showing an arrangement of an image output system in which the output device may be implemented by way of an embodiment of the invention. Image output system 10 comprises a digital still camera 12 as an image generating device for generating an image file; and a printer 20 as an output device for images. An image file generated by digital still camera 12 is transferred to printer 20 via a cable CV, or by directly inserting into printer 20 a memory card MC on which the image file is stored. Printer 20 executes an image quality adjustment process on the image data based on the read in image file, and outputs an image. As the output device, a CRT display, LCD display, or other monitor 21, a projector, or the like may be used in addition to or instead of printer 20. The following description is based on the use of a printer 20 comprising an image quality adjuster and an image output unit as the output device, with a memory card MC being inserted directly into the printer 20.

B. Arrangement of Image Generating Device

Figure 2:
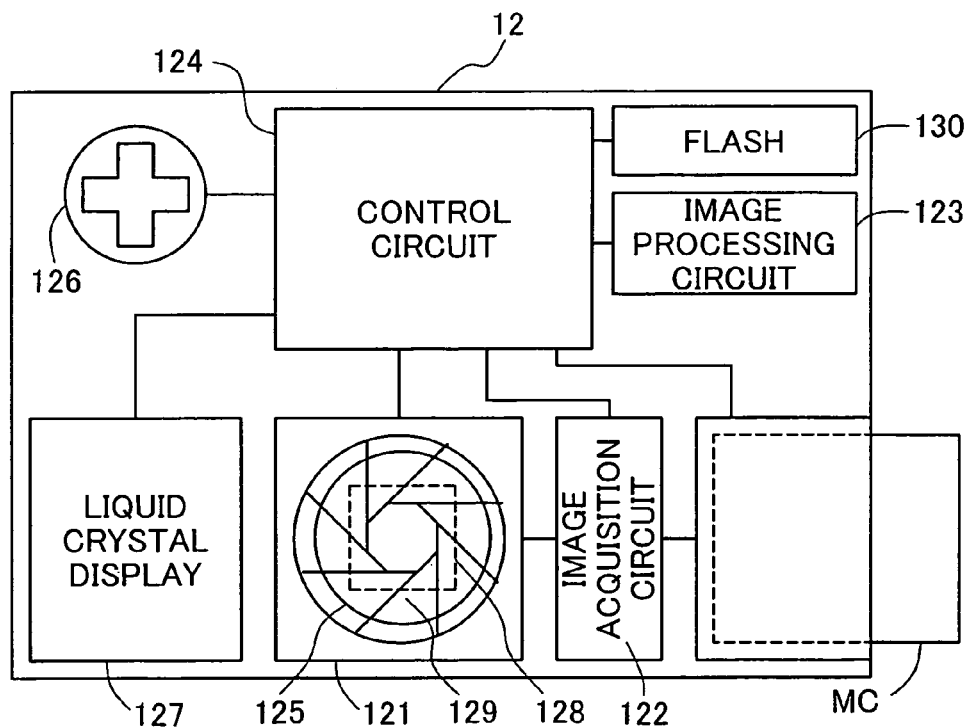
FIG. 2 is a block diagram showing a simplified arrangement of a digital still camera.

FIG. 2 is a block diagram showing a simplified arrangement of digital still camera 12. The digital still camera 12 of this embodiment comprises an optical circuit 121 for collecting optical information; an image acquisition circuit 122 for controlling the optical circuit to acquire an image; an image processing circuit 123 for processing the acquired digital image; a flash 130 serving as a supplemental light source; and a control circuit 124 for controlling the various circuits. Control circuit 124 comprises memory, not shown. Optical circuit 121 comprises a lens 125 for collecting optical information; an aperture 129 for adjusting exposure; and a CCD 128 for converting optical data passing through the lens into image data.

Digital still camera 12 stores acquired images on a memory card MC. The typical storage format for image data in digital still camera 12 is the JPEG format, but other storage formats, such as TIFF format, GIF format, BMP format, or RAW data format may be used instead.

Digital still camera 12 comprises a Select/Set button 126 for setting various shooting parameters; and a liquid crystal display 127. Liquid crystal display 127 is used to preview an image being shot, or when setting the type of light source during shooting or other parameters using the Select/Set button 126.

When a picture has been shot by digital still camera 12, image data and image generation record information are stored together in an image file on memory card MC. Image generation record information may include parameter settings relating to shooting conditions at the time of shooting (time of generation of image data), for example, type of light source at the time of shooting or other arbitrarily settable parameter settings; aperture value, shutter speed and other settings for parameters used when generating image data; and parameter settings that are set automatically, such as manufacturer name. Where the type of light source has been set by the user, the color balance of the image data is adjusted according to the color balance of the light source, and the color balance-adjusted data is stored as an image file on the memory card MC. Where the type of light source has not been set by the user, image data color balance is adjusted automatically.

C. Arrangement of Image File

Figure 3:
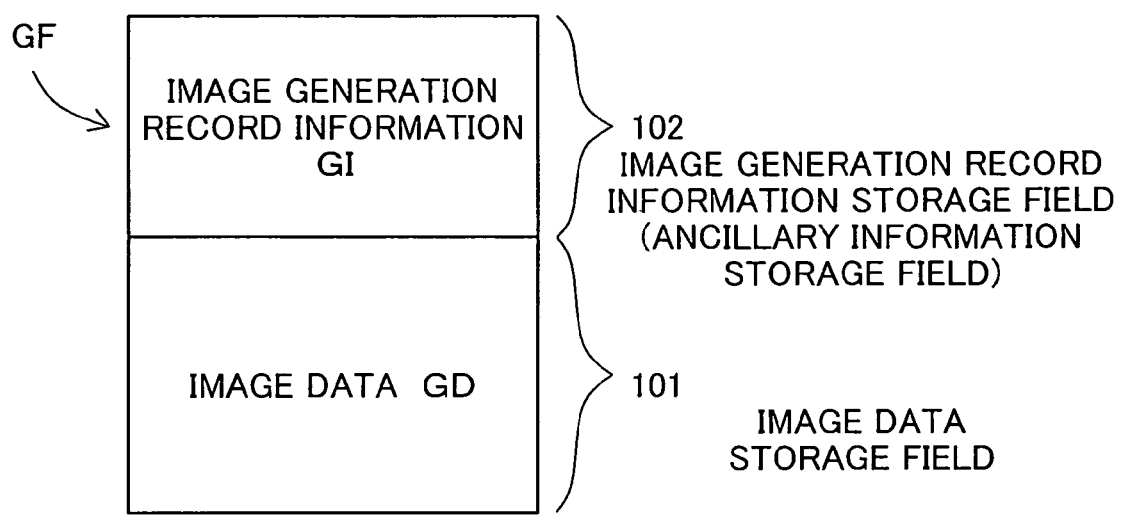
FIG. 3 is a diagram conceptually illustrating an example of an arrangement within an image file that can be used in this embodiment.

FIG. 3 is a diagram conceptually illustrating an example of the internal arrangement of an image file that can be used in this embodiment. Image file GF comprises an image data storage field 101 for storing image data GD; and an image generation record information storage field 102 for storing image generation record information GI. Image data GD is stored, for example, in JPEG format, whereas image generation record information GI is stored, for example, in TIFF format (a format in which data and data fields are specified using tags). The terms "file structure" and "data structure" in this embodiment refer to file or data structure in the form in which a file or data etc. is stored in a memory device.

It is sufficient for the image file GF in this embodiment to basically include the aforementioned image data storage field 101 and image generation record information storage field 102; file structure according to an existing standardized file format may be used. The following specific description relates to a case where the image file GF pertaining to this embodiment conforms to the Exif file format.

An Exif file has a file structure in accordance with the image file format specification (Exif) for digital still cameras, which specification has been proposed by the Japan Electronics and Information Technology Industries Association (JEITA). Similar to the conceptual diagram in FIG. 3, the Exif file format comprises a JPEG image data storage field for storing image data in the JPEG format; and an ancillary information storage field for storing information of various kinds relating to stored JPEG image data. The JPEG image data storage field corresponds to the image data storage field 101 in FIG. 3, and the ancillary information storage field to the image generation record information storage field 102. The ancillary information storage field stores image generation record information relating to a JPEG image, such as shooting date/time, aperture value, and type of light source.

Figure 4:
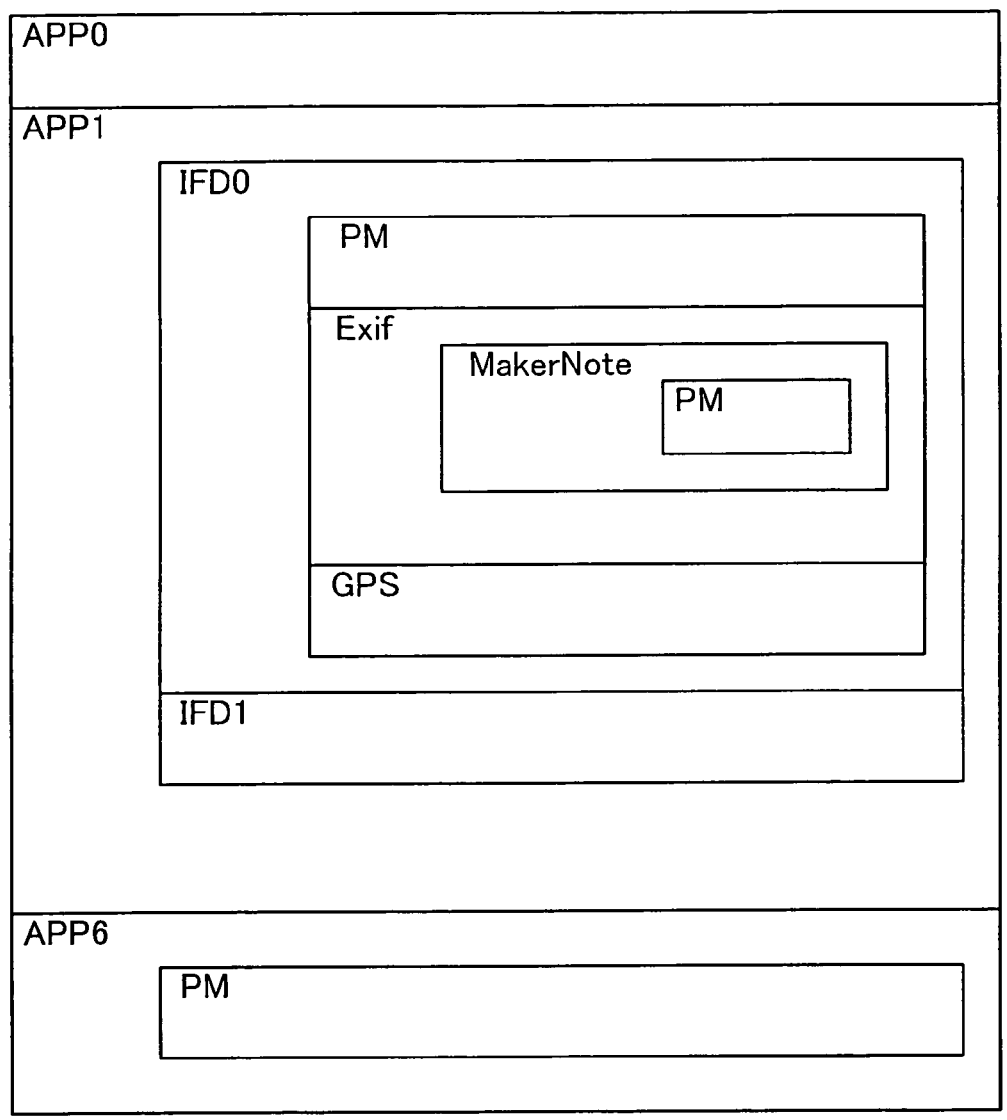
FIG. 4 is a diagram showing an example of data structure of an ancillary information storage field 103.

FIG. 4 is a diagram describing an example of data structure of ancillary information storage field 103. In the Exif file format, hierarchical tags are used to designate data fields. Each data field contains within it a plurality of subordinate data fields identified by subordinate tags. In FIG. 4, areas enclosed by rectangles represent single data fields, with tag names noted at upper left. In this embodiment, three data fields whose tag names are APP0, APP1, and APP6 are included. The APP1 data field contains within it two data fields whose tag names are IFD0 and IFD1. The IFD0 data field contains three data fields whose tag names are PM, Exif, and GPS. Data and data fields are stored according to a prescribed address or offset value; address or offset value can be searched by means of tag name. On the output device end, data corresponding to desired information can be acquired by means of specifying an address or offset value corresponding to the desired information.

FIG. 5 is a diagram showing an example of data structure (data tag names and parameter values) in the Exif data field in FIG. 4, wherein the tag names can be referenced by tracing in the order APP1-IFD0-Exif. As shown in FIG. 4, the Exif data field may include a data field whose tag name is MakerNote; the MakerNote data field may in turn include a plurality of items of data, although these have been omitted from FIG. 5.

As shown in FIG. 5, the Exif data field stores parameter values relating to information such as light source, white balance, aperture value, shutter speed, etc. In this embodiment, light source information is used as light source information relating to the color shift of the light source at the time of generation of image data; white balance is used as information for determining whether the color balance of image data has been adjusted according to user instruction. Herein, the term "white balance" refers to both the white balance adjustment process per se, and to the Exif parameter. In cases where it is desired to make clear that "white balance" refers to the Exif parameter (more generally an image generation record information parameter), the term "white balance information" will be used.

Light source information is information relating to the type of light source at the time of generation of image data. The type of light source may be set by selecting from among a number of preset parameter values, for example, daylight, fluorescent, tungsten, flash, clear, cloudy, shade, unknown, and so on. FIG. 6 is a diagram showing correspondence relationships between light source type and light source color (color shift). By preparing such a correspondence table in advance, it becomes possible to utilize the type of light source setting as information relating to light source color shift. Color of a light source derived from light source information is used in the image quality adjustment process described later.

Where a particular type of light source has been set by the user during shooting, that setting is stored as the parameter value of light source information. Also, the image generating device comprises a light source detector for automatically detecting the type of light source, and where the type of light source has been determined automatically using this function, this auto-detect result is stored as the parameter value of light source information.

White balance information is information for determining whether the color balance of image data has been adjusted according to user instruction. Where light source information has been set manually by the user, "Manual Set" is set as a parameter value of the white balance information, and where set automatically, "Auto Set" is set. Where light source information has been set manually by the user, in the image generating device, there is generated image data whose color balance is adjusted according to the color balance of the user-set light source (i.e. image data having adjusted white balance). Accordingly, where the parameter value of white balance information is "Manual Set", it can be determined that color balance (white balance) of the image data has been adjusted according to user instruction.

Aperture value is information relating to aperture at the time that image data is generated; F number is used as the parameter value. Accordingly, a higher aperture value means a smaller aperture.

Shutter speed information is information relating to shutter speed at the time that image data is generated; the unit is seconds.

D. Arrangement of Image Output Device

Figure 7:
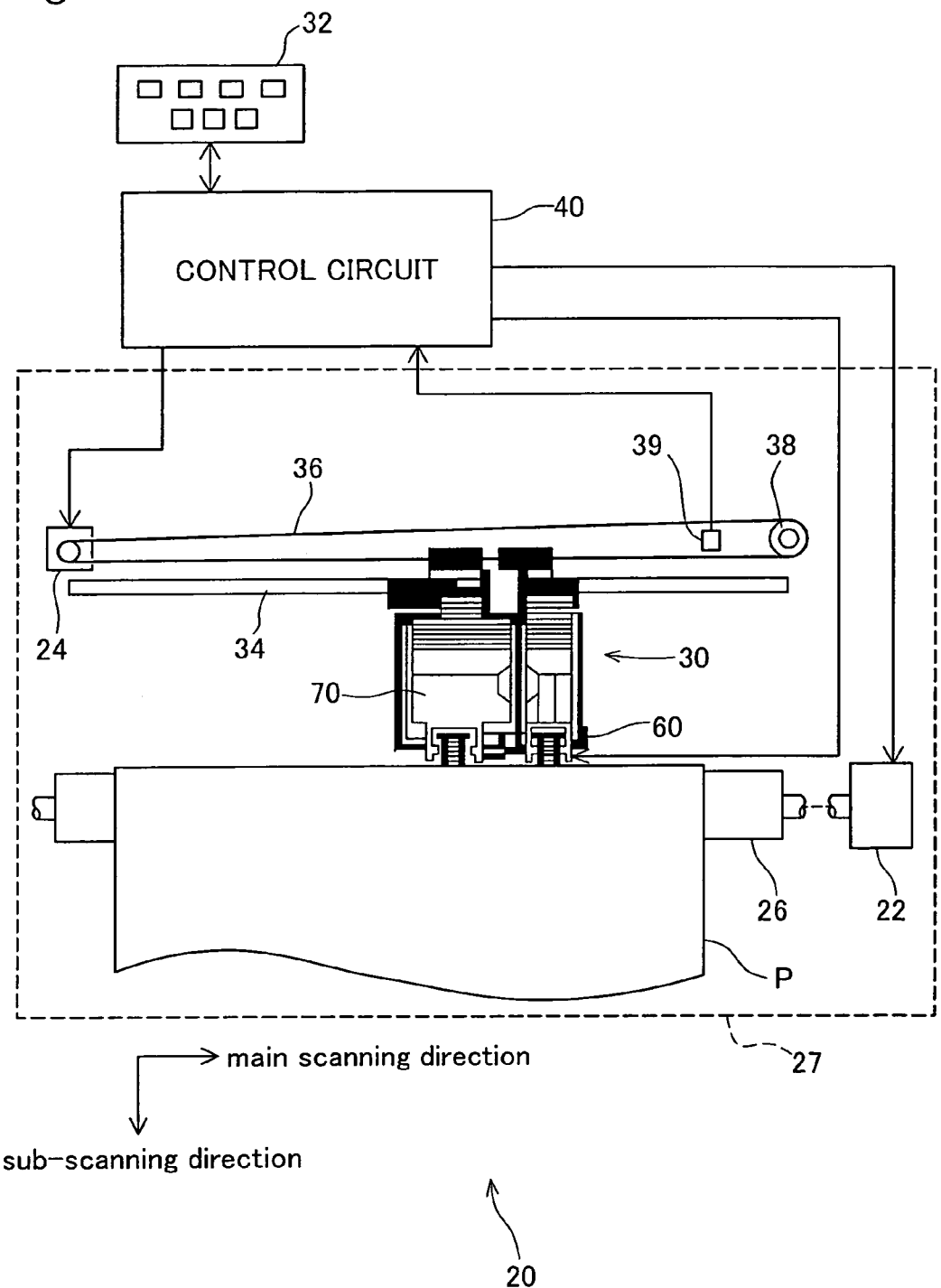
FIG. 7 is a simplified arrangement diagram of a printer.

FIG. 7 is a simplified arrangement diagram of a printer. Printer 20 is a printer capable of image output, for example, an ink jet printer that ejects inks of four colors, namely cyan C, magenta Mg, yellow Y, and black K, onto a print medium to produce a dot pattern. An electrophotographic printer that transfers and fixes toner onto a print medium may be used instead. In addition to the four colors indicated above, light cyan LC which is lighter in density than cyan C, light magenta LM which is lighter in density than magenta Mg, or dark yellow DY which is darker in density than yellow Y may be used as inks. Where instead monochromatic printing is performed, the arrangement may employ black K only; or red R and green G may be used. The type of ink or toner used may be selected according to the characteristics of the image being output.

As shown in the drawing, printer 20 comprises an image output section 27 for executing printing; a control panel 32; and a control circuit for controlling signal exchange in the control panel 32 and image output section 27. The image output section 27 comprises a sub-scan feed mechanism for advancing printing paper P in the sub-scanning direction by means of a paper feed motor 21; a main scan feed mechanism for reciprocating a carriage 30 in the axial direction of a platen 26 (main scanning direction) by means of a carriage motor 24; and a head driving mechanism for driving a print head unit 60 mounted on carriage 30 to eject ink and form dots. The print head unit 60 comprises a print head (not shown) equipped with nozzles for ejecting the utilizable ink(s).

The sub-scan feed mechanism for advancing printing paper P comprises a gear train (omitted from the drawing) for transmitting rotation of paper feed motor 22 to platen 26 and an auxiliary paper feed roller (not shown). The main scan feed mechanism for reciprocating carriage 30 comprises a slide rail 34 extending parallel to the axis of platen 26, for slidably retaining carriage 30; a pulley 38 coupled via an endless drive belt 36 to carriage motor 24; and a position sensor 39 for sensing the home position of carriage 30.

Figure 8:
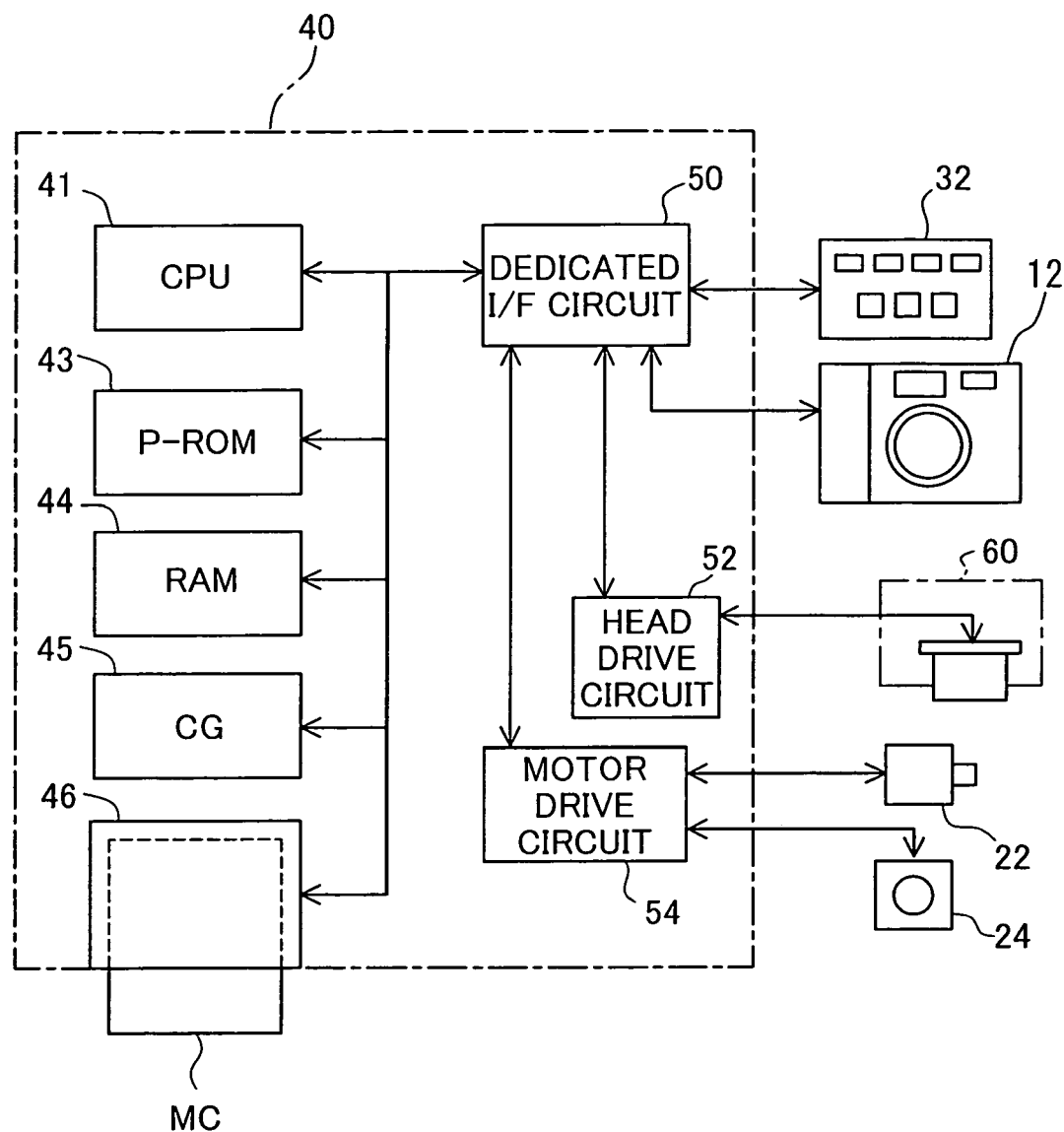
FIG. 8 is a block diagram showing an arrangement of a printer.

FIG. 8 is a block diagram showing the arrangement of printer 20.

Control circuit 40 is arranged as an arithmetic-logic unit comprising a CPU 41 for executing image quality adjustment processing described later, RAM 44 for temporary storage of CPU 41 operation results, image data and the like, programmable ROM (PROM) 43 for storing data needed for image quality adjustment processing, such as a program for the image quality adjustment process, and a character generator (CG) 45 having stored in memory character dot matrices. This control circuit 40 additionally comprises a memory card slot 46 for acquiring data from memory card MC, a dedicated I/F circuit 50 dedicated to providing interface with external memory and the like, a head drive circuit 52 connected to the dedicated I/F circuit 50, for driving the print head unit 60, and a motor drive circuit 54 for driving the paper feed motor 22 and carriage motor 24. The dedicated I/F circuit 50 additionally includes a universal serial bus interface circuit, and is able to receive via a cable data supplied from an image generating device such as digital still camera 12. The circuitry within the dedicated I/F circuit 50 is not limited to a universal serial bus interface circuit, and may be determined in consideration of ease of interconnection with image generating devices. RAM 44 functions as buffer memory for temporary storage of raster data.

Printer 20 is able to acquire, for example via a cable CV, image data generated by an image generating device such as digital still camera 12. An arrangement whereby the image generating device stores image data on a memory card MC, and the printer 20 acquires the image data via the memory card MC, is also possible. An arrangement whereby image data is acquired via a network (not shown) is also possible.

Once an image data processing program starts up upon detecting that a memory card MC has been inserted into memory card slot 46 or whether a digital still camera 12 has been connected to dedicated I/F circuit 50 via a cable, the CPU 41 of the control circuit 40 executes an image quality adjustment process to adjust the white balance of the image data. That is, control circuit 40 functions as an image quality adjuster. An arrangement whereby the image data processing program is run under user control is possible as well. The image processing executed by CPU 41 will be described in detail later.

The printer 20 having the hardware configuration described above advances the printing paper P by means of the paper feed motor 22 while reciprocating the carriage 30 by means of the carriage motor 24, while at the same time driving the print head to carry out ejection of drops of each ink, forming ink dots to form on the printing paper P an image based on the image quality-adjusted image data.

E. Image Processing

E1. Flowchart of Image Processing

Figure 9:
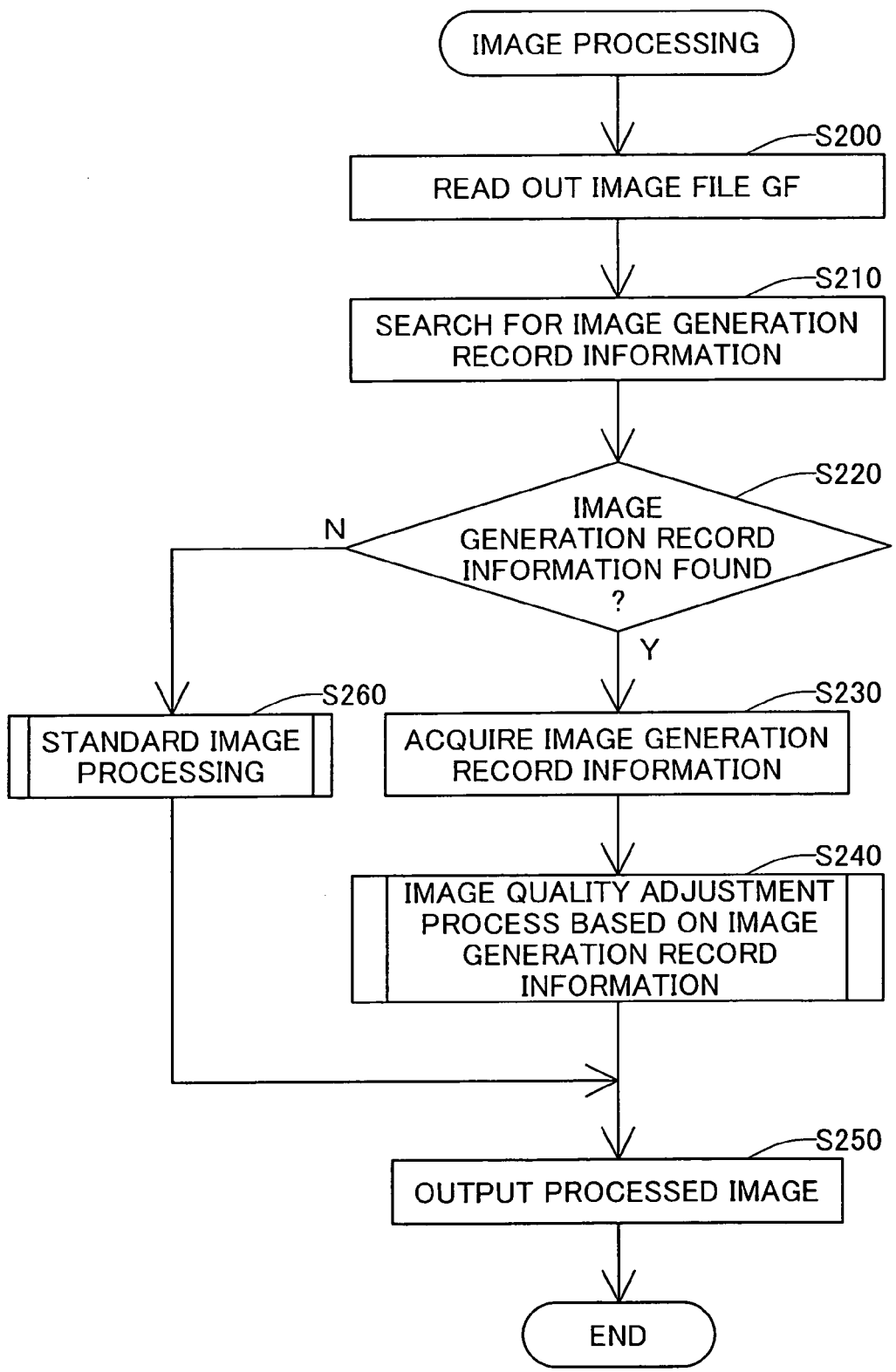
FIG. 9 is a flowchart showing the processing routine of image processing.

FIG. 9 is a flowchart showing the processing routine of image processing by printer 20 of the embodiment. In the following description, the description is based on a case where a memory card MC having an image file GF stored thereon is inserted directly into printer 20. When memory card MC is inserted into memory card slot 46, the CPU 41 of control circuit 40 (FIG. 8) of printer 20 reads the image file GF (FIG. 3) from memory card MC (Step S200). Next, in Step S210, CPU 41 searches in the ancillary information storage field of image file GF for image generation record information GI indicating information at the time that the image data was generated. In the event that image generation record information GI is found (Step S220: Y), CPU 41 acquires and analyzes the image generation record information GI (Step S230). On the basis of the analyzed image generation record information GI, CPU 41 executes image processing, described hereinbelow (Step S240), outputs the processed image (Step S250), and terminates the processing routine.

An image file created by a drawing application program or the like, on the other hand, will not contain image generation record information GI having information such light source information and the like. If CPU 41 cannot find image generation record information GI (Step S220: N), it performs standard processing (Step S260), outputs the processed image (Step S250), and terminates the processing routine.

Figure 10:
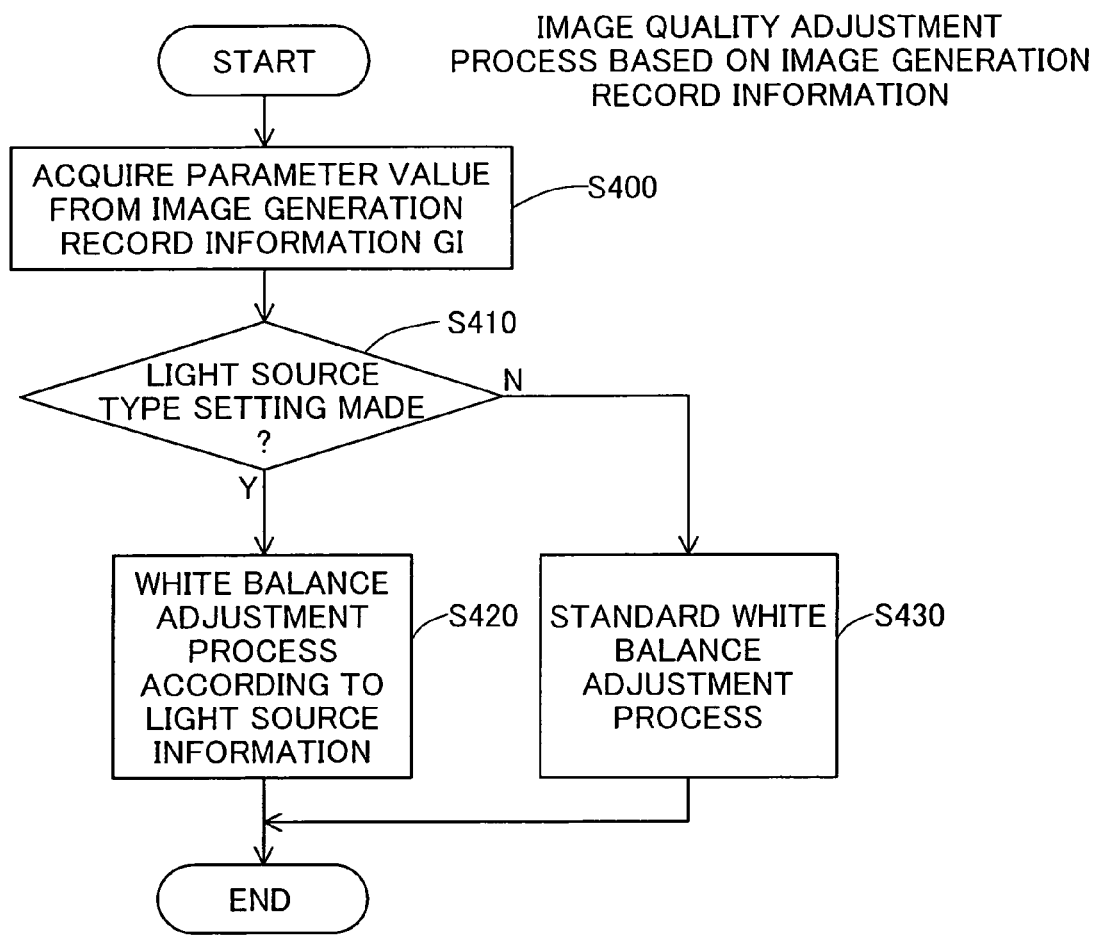
FIG. 10 is a flowchart showing the processing routine of an image quality adjustment process.

E2. Image quality Adjustment Process Based on Image Generation Record Information FIG. 10 is a flowchart showing the processing routine of an image quality adjustment process (corresponding to Step S240 in FIG. 9) based on image generation record information. The CPU 41 of control circuit 40 (FIG. 8) of printer 20 analyzes the image generation record information GI and acquires parameter values for light source information etc. (Step S400). Next, in Step S410, CPU 41 determines, by way of a light source information parameter value, whether a light source type has been established, that is, whether there exists information relating to color shift of the light source. In the event that a light source type has been established in the parameter values for light source information, CPU 41 determines that a light source type has been established. Where "unknown" has been established as a light source information parameter value, the determination is made that no light source type has been established. The determination that no light source type has been established is also made in cases where image generation record information GI contains no light source information.

In the event of a determination that a light source type has been established (Step S410: Y), CPU 41 executes a white balance adjustment process with reference to the light source information (Step S420), and terminates the image quality adjustment process. In the white balance adjustment process with reference to the light source information, white balance is adjusted according to the shift in color of the light source, obtained from the light source information (described in detail hereinbelow).

In the event of a determination that no light source type has been established (Step S410: N), CPU 41 executes a standard white balance adjustment process (Step S430), and terminates the image quality adjustment process.

E3. Standard White Balance Adjustment Process

Figure 11:
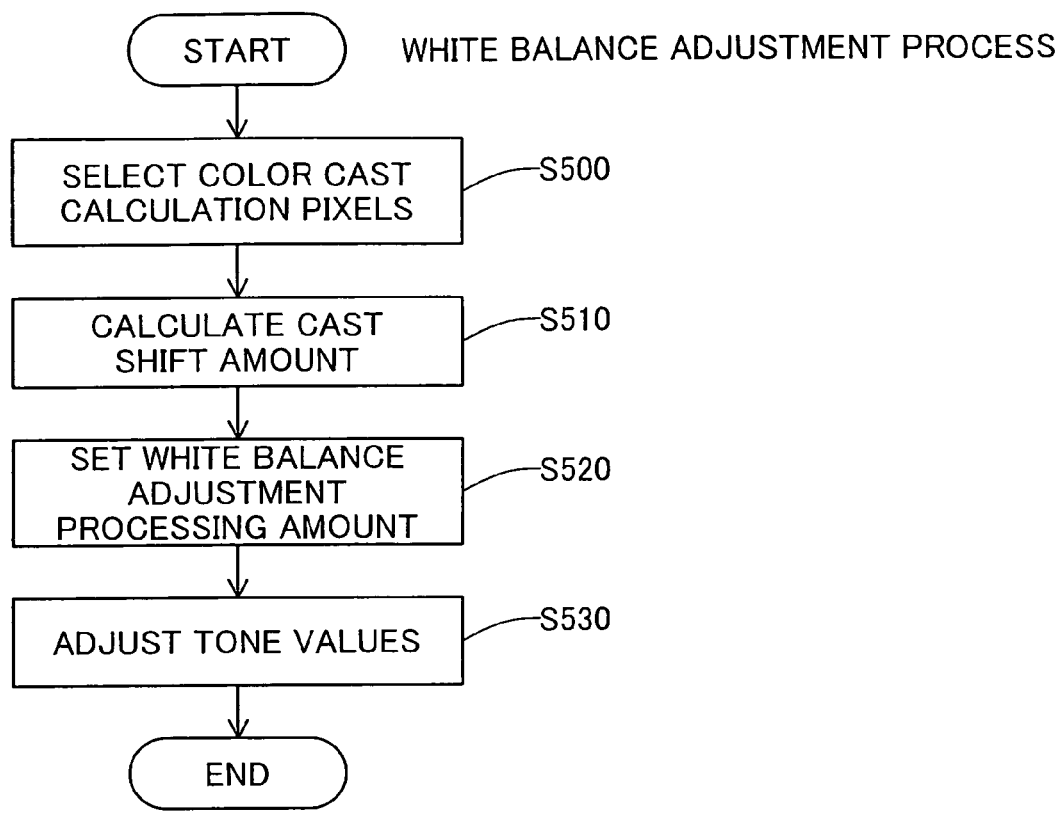
FIG. 11 is a flowchart showing a white balance adjustment process.

FIG. 11 is a flowchart showing the processing routine of the white balance adjustment process in the embodiment. In Step S500, CPU 41 (FIG. 8) selects pixels for analysis, for use in calculating an amount of color cast (hereinafter termed "pixels for color cast calculation") described later. Next, in Step S510, using the pixel values selected in Step S500, an amount of color cast is calculated for each of red R, green G and blue B. The amount of color cast is an index indicating the magnitude of deviation from gray of a color in image data, and assumes a larger value the greater the color deviation. For example, as the color cast amount for red, it may be possible to use the difference between the average value of red R tone values and the average value of tone values for all colors together (described in detail later). As the kind of color used for calculating color cast amount, besides a combination of the primary colors red R, green B and blue B, it may be possible to use any of various other combinations, such as cyan C, magenta Ma, and yellow Y. Next, in Step S520, an amount of the white balance adjustment process is established on the basis of color cast amount, and in Step S530 tone values of colors are adjusted so as to minimize color cast.

Figure 12A:
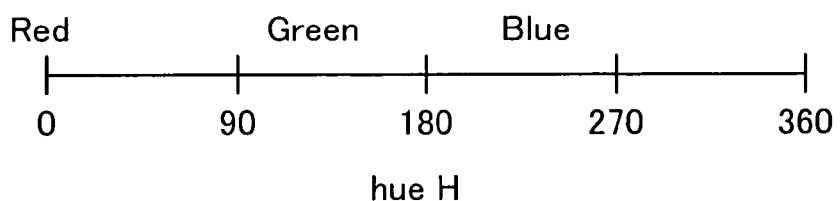
FIGS. 12(a)-12(c) illustrate a condition for selecting a pixel group to calculate color cast.
Figure 12B:
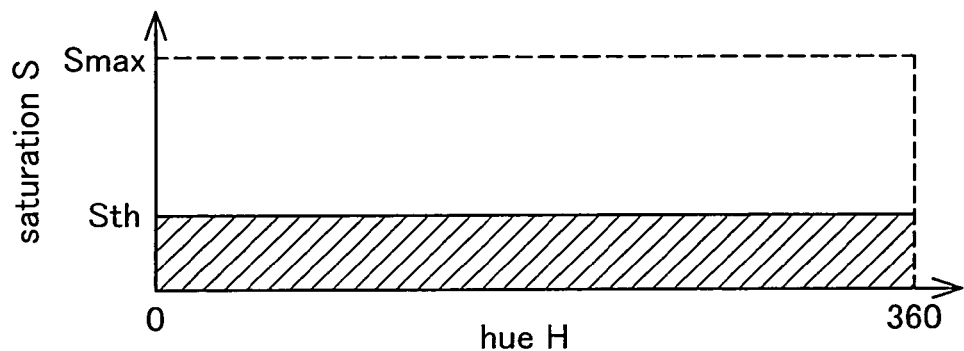
Figure 12C:
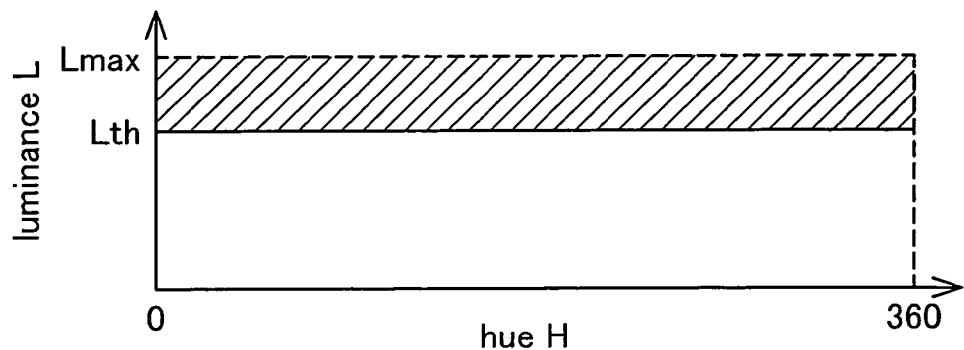

FIG. 12(a)-12(c) illustrate a condition for selecting a pixel group to calculate an amount of color cast, selected in Step S500 (FIG. 11). In this embodiment, pixels approximating achromatic color and meeting the following two conditions are selected as pixels for color cast calculation:

(s1) Saturation S is equal to or less than a saturation threshold value Sth.

(s2) Luminance L is equal to or greater than a luminance threshold value Lth.

FIG. 12(a) illustrates the relationship between hue H value and color. In this embodiment, hue H can assume values within a range of 0° to 360°, with 0° indicating red, 120° indicating green, and 240° indicating blue.

FIG. 12(b) illustrates the relationship between saturation threshold value Sth and hue H. In the standard white balance adjustment process, the saturation threshold value Sth is a constant value not dependent on hue H. In FIG. 12(b), the area in which the aforementioned condition (s1) is met is denoted by diagonal lines.

FIG. 12(c) illustrates the relationship between luminance threshold value Lth and hue H. In the standard white balance adjustment process, the saturation threshold value Lth is a constant value not dependent on hue H. In FIG. 12(c), the area in which the aforementioned condition (s2) is met is denoted by diagonal lines.

The aforementioned first condition (s1) may be understood as follows. Where a vividly colored, non-achromatic subject is caught on camera, saturation will be high in an image area in which the subject appears. If an amount of color cast is calculated using such an area, while the amount of color cast derived will be high, this color cast will not be attributable to color deviation occurring due to shift in the color of the light source. Thus, if tone value adjustment is carried out so as to minimize this apparent color cast amount, in some cases the result will be that that vividness of color and hue inherent to the subject is significantly altered. Accordingly, by instead calculating the amount of color cast using an area that meets the aforementioned first condition (s1), i.e., an area whose saturation S is equal to or less than saturation threshold value Sth, it is possible to carry out the white balance adjustment process without significantly altering the vividness of color and hue inherent to the subject. As the saturation threshold value Sth, there may be employed a value determined on the basis of sensory evaluation of image output results. For example, where saturation assumes values in a range of 0-1, a value of 0.1 may be used as the threshold value. Since a smaller saturation value enable selection of an area that closely approximates achromatic color, the effects of vividness of color and hue inherent to a subject on the white balance adjustment process can be minimized further. Additionally, the saturation threshold value can be used as the magnitude of the white balance adjustment process (described in detail later).

The aforementioned second condition (s2) may be understood as follows. An area of high luminance is likely to be receiving strong light from the light source. Thus, it is likely that an area of high luminance will more strongly reflect color deviation due to the spectral distribution of the light source. Accordingly, by calculating the amount of color cast using an area that meets the aforementioned first condition (s2), i.e., an area whose luminance L is equal to or greater than luminance threshold value Lth, it is possible to calculate with greater accuracy the amount of color cast due to the type of light source. As the luminance threshold value Lth, there may be employed a value determined on the basis of sensory evaluation of image output results. For example, where luminance can assume values in a range of 0-255, a value of 180 may be used as the threshold value. Additionally, the luminance threshold value can be used as the magnitude of the white balance adjustment process (described in detail later).

By using pixels that meet the two conditions (s1) (s2) described above, an amount of color cast can be calculated appropriately on the basis of color shift of the light source.

Where image data is represented in a color space that does not include luminance, hue, and saturation as parameters, e.g., where represented in an RGB color space, luminance, hue, and saturation values at pixel locations may be derived through conversion to a color space that includes luminance, hue, and saturation values, for example, an HLS color space or HIS color space.

Figure 13A:
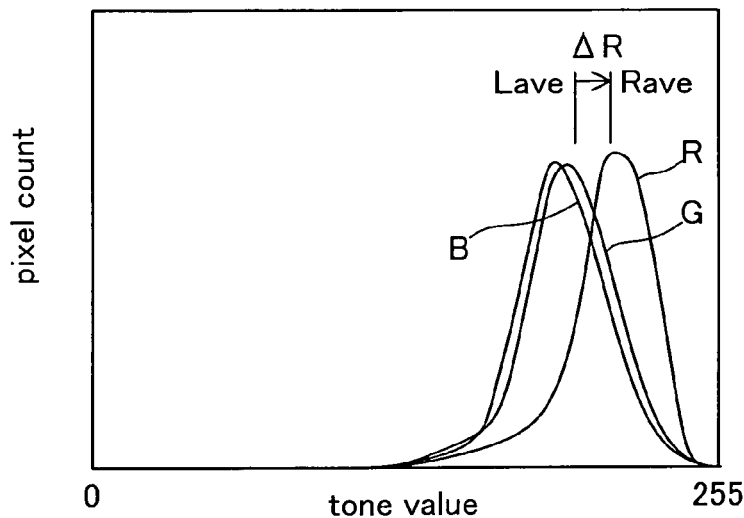
FIGS. 13(a) and 13(b) illustrate an amount of color cast and a tone value adjustment process.
Figure 13B:
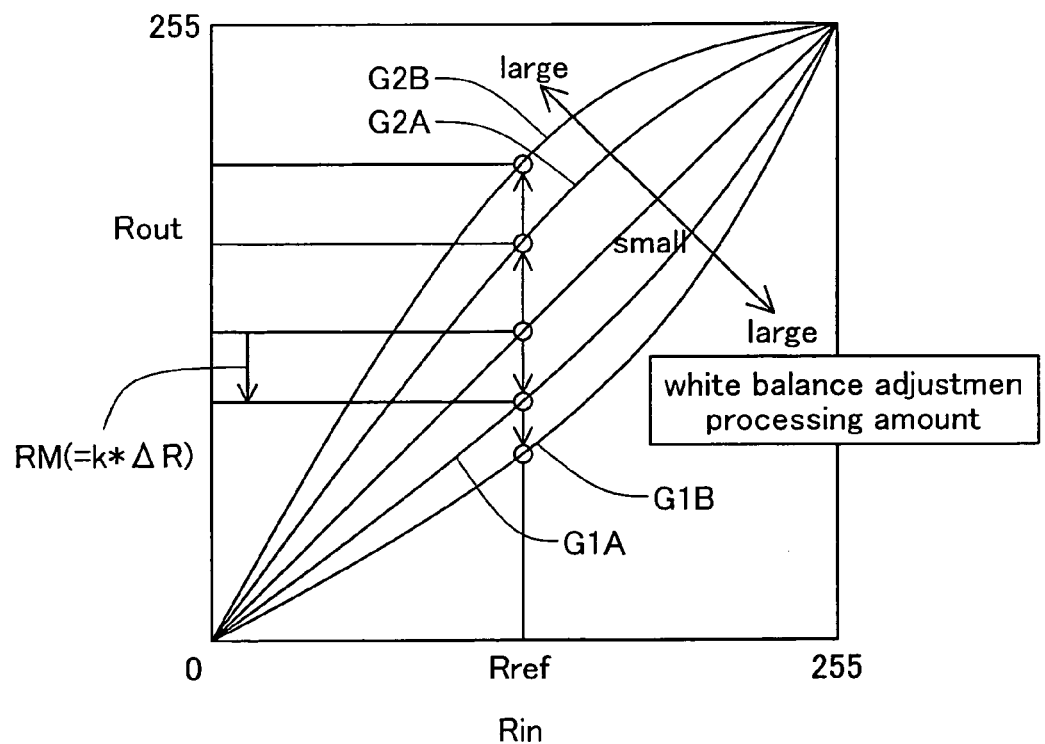

FIGS. 13(a) and 13(b) illustrate an exemplary amount of color cast and a tone value adjustment process. FIG. 13(a) shows a tone value distribution example for red R in a pixel group for color cast calculation selected in Step S500 (FIG. 11). In the example of FIG. 13(a), red R is more shifted to the high end than are green G and blue B. Images exhibiting such a distribution tend to be produced under reddish light sources, such as where a tungsten lamp is used, for example.

Equation 1 given below is an equation used to calculate color cast amounts $\Delta R$, $\Delta G$, $\Delta B$ in this embodiment.

$$\Delta R = R_{ave} - L_{ave}$$

$$\Delta G = G_{ave} - L_{ave}$$

$$\Delta B = B_{ave} - L_{ave} \qquad [\text{Eq. 1}]$$

$R_{ave}$: average value of R in pixel group for color cast calculation

Gave: average value of G in pixel group for color cast calculation

Bave: average value of B in pixel group for color cast calculation

Lave: luminance value calculated from Rave, Gave, Bave

In the example given by Equation 1, color cast amounts ΔR, ΔG, ΔB for the colors RGB are given by the differences of the average tone values Rave, Gave, Bave for the RGB colors from luminance Lave calculated using the average tone values for all colors. As the computational equation for calculating luminance value, there may be used, for example, the equation for converting from an RGB color space to a YCbCr color space given by the following Equation 2.

$$Y=L=0.299*R+0.587*G+0.114*B \quad [\text{Eq. 2}]$$

The luminance value Lave derived using this computational equation can be termed an average tone value for red R, green G and blue B, calculated by weighting them with difference weights indicating brightness contributions of respective colors. Where color deviation is minimal, average tone values Rave, Gave, and Bave for the colors RGB will be substantially equal, so the luminance value, i.e. the brightness-weighted average tone value Lave, will be substantially equal to the average tone values Rave, Gave, and Bave for each color. As a result, color cast amounts ΔR, ΔG, ΔB for the colors will have small values. Where there is appreciable color deviation, however, average tone values Rave, Gave, and Bave for the colors RGB will have different values from one another. In this case, color cast amounts will be greater for colors having greater deviation from the standard value represented by luminance value Lave. By using, as a standard value for calculating color cast amount, an average tone value (luminance value) calculated while weighting with difference weights indicating brightness contributions of respective colors, it is possible to calculate color cast amounts that more closely approximate perception by the human eye.

FIG. 13(b) illustrates the relationship between red R input level Rin and output level Rout in the tone value adjustment process of this embodiment. Graph G1A is constituted such that output level Rout is smaller than input level Rin. By carrying out the tone value adjustment process using this graph G1A, in an image with color deviation towards red, i.e., an image in which red R is shifted towards the high end, the tone values for red R can be reduced so as to reduce the extent of color deviation.

Such a graph G1A may be designed such that, for example, output level Rout at an adjustment input level Ref is adjusted so as to be smaller than the original value by an adjustment amount RM. Output levels Rout at other input levels Rin are then interpolated using a spline function. Adjustment amount RM is a value determined by color cast amount ΔR (FIG. 13(a), Equation 1); it is possible to use, for example, color cast amount ΔR multiplied by a predetermined coefficient k. This predetermined coefficient k can be a value determined on the basis of sensory evaluation of image output results. The relationship between color cast amount ΔR and adjustment amount RM need not necessarily be a proportional relationship; it is sufficient that adjustment amount RM increases as color cast increases. Predetermined coefficient k is a process parameter representing a proportion of an amount of the white balance adjustment process to an amount of the color cast (hereinafter termed "processing amout proportion"), and can be used as the magnitude for the white balance adjustment process (described in detail later). A predetermined value can be used as the adjustment input level Ref. For example, where the range of values assumable by red R is 0-255, the median value of 128 may be used.

Graph G1B depicts an input/output relationship for use in a tone value adjustment process having a greater amount of white balance adjustment processing than in graph G1A. Here, "greater amount of white balance adjustment processing" means a larger change in tone value of a color. Where color cast amount ΔR is appreciable, the adjustment amount RM calculated using predetermined coefficient k will be large, and the white balance adjustment processing amount will be large as well. It is accordingly possible to reduce color shift even in cases of appreciable color cast ΔR. By means of an arrangement such that the white balance adjustment processing amount increases with greater color cast, color shift can be reduced appropriately depending on the amount of color cast.

Graph G2A gives an input/output relationship designed so that output level Rout is large compared to input level Rin, and is intended for use when red R is shifted towards the low end. Graph G2B gives an input/output relationship for use in a tone value adjustment process with a greater amount of white balance adjustment processing than graph G2A. Where color is shifted towards the low end, that is, where average tone level Rave is smaller than the standard luminance value Lave, in the same manner as when shifted towards the high end an adjustment amount RM is established on the basis of color cast amount ΔR and an amount of white balance adjustment processing is established accordingly.

Relationships of input level to output level like those described above are established for the other colors besides red R.

Figure 14A:
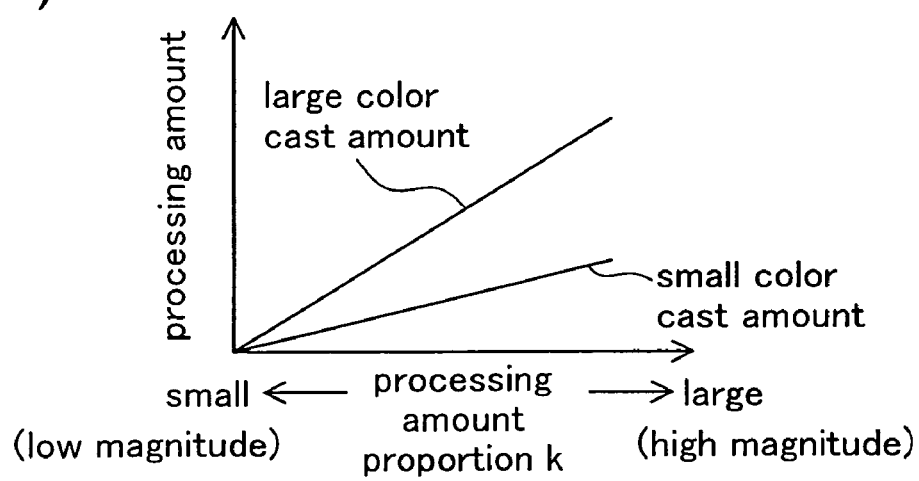
FIGS. 14(a) and 14(b) illustrate a magnitude of the white balance adjustment process.
Figure 14B:
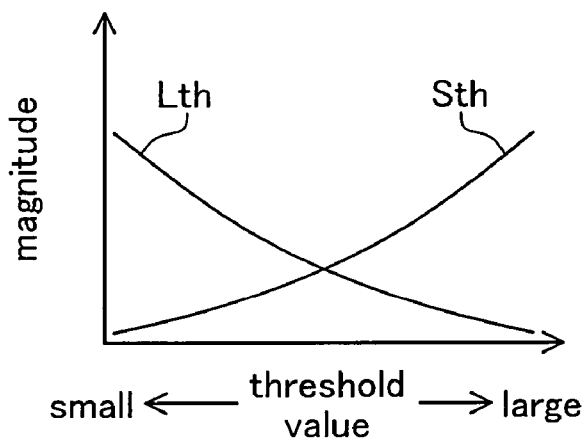

FIGS. 14(a) and 14(b) illustrate magnitude of the white balance adjustment process. FIG. 14(a) describes a relationship between an amount of white balance adjustment and a proportion of the amount of white balance adjustment processing to an amount of color cast. The processing amount proportion k of the example shown in FIG. 13(b) may be used as the proportion of processing amount, for example. By increasing the processing amount proportion k used in calculating adjustment amount RM (FIG. 13(b)), adjustment amount RM can be increased for a given color cast amount ΔR. As a result, an amount of white balance adjustment processing can be increased for a given color cast amount ΔR. That is, by increasing processing amount proportion k, the magnitude of white balance adjustment processing can be made stronger. Herein, "stronger white balance adjustment processing magnitude" means that the processing amount of the white balance adjustment process is greater for a given color-shifted pixel. As shown in FIG. 14(a), even in cases where the magnitude of white balance adjustment process is strong, where deviation in color is minimal, i.e. color cast amount is small, the amount of white balance adjustment processing will be small as well. Processing amount proportion k can be viewed as a processing parameter determining the size of the amount of white balance adjustment processing based on the size of color cast amount.

FIG. 14(b) describes a relationship between the condition range (saturation threshold value Sth and luminance threshold value Lth) for selecting a color cast calculation pixel group, and the magnitude of white balance adjustment processing. Pixels having saturation S equal to or less than saturation threshold value Sth are selected for the color cast calculation pixel group. Accordingly, a greater saturation threshold value Sth enables selection of pixels with higher saturation and vivid color, so in an image having color cast, a higher color cast amount will be calculated the greater the saturation threshold value Sth is. That is, for a given color-shifted image, greater saturation threshold value Sth will result in a greater amount of white balance adjustment processing. In other words, the magnitude of white balance adjustment processing is greater with larger saturation threshold values Sth. Saturation threshold value Sth is also a process parameter that affects the result of the process for determining the size of color cast amount in image data.

With regard to luminance threshold value Lth, on the other hand, pixels having luminance L equal to or greater than luminance threshold value Lth are selected for the color cast calculation pixel group. In bright areas, color approximates white at greater luminance L levels. Accordingly, in opposition to saturation threshold value Sth, a smaller luminance threshold value Lth is associated with higher likelihood of selecting greater numbers of vividly colored pixels, so in an image having color cast, a greater color cast amount will be calculated the smaller the luminance threshold value Lth is. That is, for a given color-shifted image, smaller luminance threshold value Lth will result in a greater amount of white balance adjustment processing. In other words, the amount of white balance adjustment processing is greater with smaller luminance threshold values Lth. Luminance threshold value Lth is also a process parameter that affects the result of the process for determining the size of color cast amount in image data.

Figure 15A:
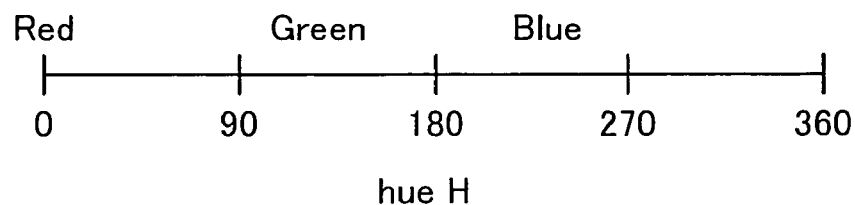
FIGS. 15(a)-15(c) illustrate a white balance adjustment process according to light source information.
Figure 15B:
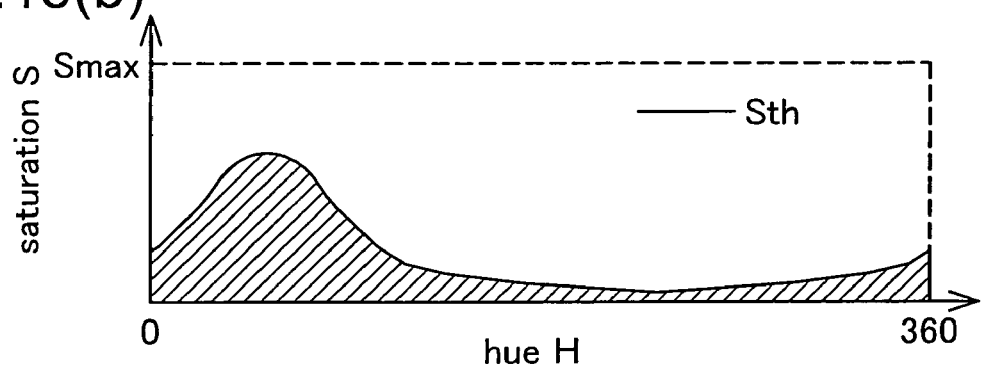
Figure 15C:
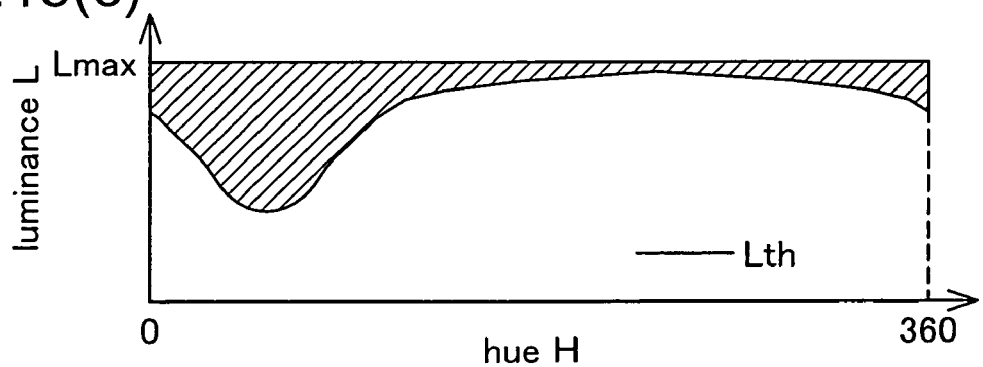

E4. Embodiment 1 of White Balance Adjustment Process According to Light Source Information FIGS. 15(a)-15(c) illustrate a white balance adjustment process according to light source information. In the example of FIGS. 15(a)-15(c), there is shown a case in which a tungsten lamp (incandescent light) is used as the light source, with "tungsten" being set in the light source information. The difference with the standard white balance adjustment process shown in FIGS. 12(a)-12(c) is that the saturation threshold value Sth and luminance threshold value Lth for selecting color cast calculation pixel groups vary depending on hue H.

FIG. 15(b) depicts a relationship between saturation threshold value Sth and hue H. In this embodiment, the arrangement is such that saturation threshold value Sth increases as the hue H of a pixel more closely approximates orange, which is the hue of the light source. Light source hue is a value determined depending on the type of light source. Where light source hue is included in image generation record information GI, CPU 41 (FIG. 8) acquires the value thereof, and carries out adjustment of saturation threshold value Sth based on the hue of the light source. Alternatively, a hue table (FIG. 6) indicating correspondence relationships between types of light source and hue (color shifts) may be stored in PROM 43 (FIG. 8) or other memory. Where image generation record information GI includes, for example, light source type as information relating to light source color shift, CPU 41 can use the type of light source to acquire the hue of the light source from the hue table.

FIG. 15(c) depicts a relationship between luminance threshold value Lth and hue H. In this embodiment, the arrangement is such that luminance threshold value Lth decreases as the hue H of a pixel more closely approximates orange, which is the color of the light source.

In this embodiment, the setup is such that the more closely hue H approximates the color of the light source, the higher the saturation S of pixels selected as a color cast calculation pixel group. Thus, a higher level of color cast will be calculated for an image having color cast produced by the light source, i.e. an image having color shifted towards the hue of the light source. On the other hand, pixels of hue H far away from the hue of the light source are likely to be not originally achromatic pixels, but rather pixels having hue characteristic of the photographic subject. In such areas, pixels of high saturation are not selected for the color cast calculation pixel group. Accordingly, by means of carrying out white balance adjustment process with a processing amount based on the color cast amount derived in the above manner, appreciable alteration of the color balance of the subject can be avoided, and color cast can be minimized appropriately with reference to the color shift of the light source.

With regard to luminance L, the setup is such that the more closely hue H approximates the color of the light source, the lower the luminance L of pixels selected as a color cast calculation pixel group. The reason for doing so is that where color cast occurs due to the color of the light source, pixels of low luminance L are likely to be the result of the effect of light source color on achromatic pixels. By selecting as the color cast calculation pixel group pixels that, of those having hue close to the light source color, have low luminance L, it becomes possible to calculate color cast amount more appropriately.

In the example of FIGS. 15(a)-15(c), both the saturation threshold value Sth and luminance threshold value Lth vary continuously with variation in hue H; however, these threshold values may instead be set up to vary in stepwise fashion among a number of steps. Also, in order to avoid pixels of hue H far apart from the hue of the light source from being selected as the color cast calculation pixel group, it would be possible, within the range of hues H far apart from light source hue, to set the saturation threshold value Sth to 0 or to set the luminance threshold value Lth to the maximum value which luminance can assume. In this way, by eliminating pixels of hue H far apart from the hue of the light source from the color cast calculation pixel group, it becomes possible to calculate more accurately color cast produced by color shift of the light source.

In the event that there is no color shift of the light source indicated in light source information, i.e. where the color of the light source is pure white, it is preferable to execute the standard white balance adjustment process in which saturation threshold value Sth and luminance threshold value Lth do not vary depending on hue H.

Figure 16A:
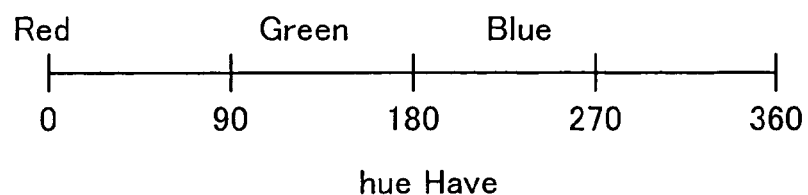
FIGS. 16(a) and 16(b) illustrate another white balance adjustment process according to light source information.
Figure 16B:
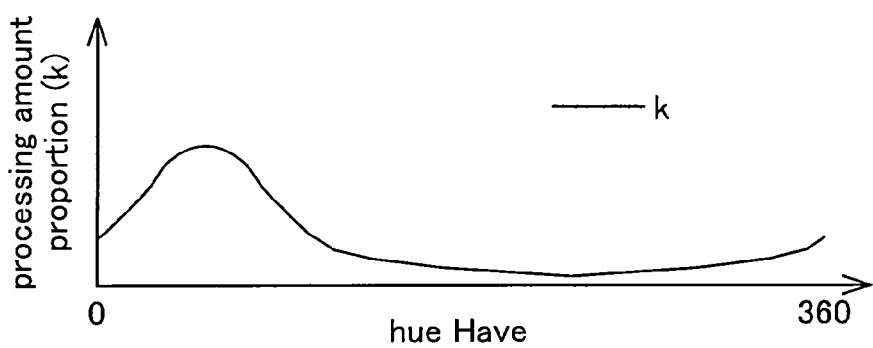

E5. Embodiment 2 of White Balance Adjustment Process According to Light Source Information FIGS. 16(a) and 16(b) illustrate a white balance adjustment process according to light source information. In the example of FIGS. 16(a) and 16(b), there is shown a case in which a tungsten lamp is used as the light source, with "tungsten" being set in the light source information. The difference with the standard white balance adjustment process shown in FIGS. 12(a)-12(c) and FIGS. 13(a)-13(b) is that the processing amount proportion k (FIG. 13(b)) is designed to vary depending on average hue Have for a color cast calculation pixel group. Hue Have represents average hue for a color cast calculation pixel group; for example, hue calculated from the red R average value Rave, green G average value Gave, or blue B average value Bave (Equation 1) may be used. In this embodiment, the same conditions as those for the standard white balance adjustment process shown in FIGS. 12(a)-12(c) are used as the conditions for selecting the color cast calculation pixel group.

FIG. 16(b) shows the relationship between processing amount proportion k and hue Have. In this embodiment, processing amount proportion k increases as the hue Have comes closer to the hue of the light source, namely orange. Where color cast is produced as a result of light source color shift, hue Have will assume a value close to the hue of the light source. On the other hand, where hue Have is a value far apart from the hue of the light source, the likelihood is high that many pixels that are not originally pixels close to achromatic, but rather pixels having hue characteristic of the photographic subject, may be selected as the color cast calculation pixel group. Accordingly, by increasing the processing amount proportion k as the hue Have comes closer to the hue of the light source, it is possible to minimize color cast due to color shift of the light source, while also avoiding appreciable alteration of vividness and hue of color inherent to a photographic subject.

In the example of FIGS. 16(a) and 16(b), processing amount proportion k varies continuously with variation in hue Have; however, it may instead be set up to vary in stepwise fashion among a number of steps. Also, it is possible to set the processing amount proportion k to be zero within the range of hue Have far apart from the hue of the light source. By so doing, it is possible to avoid appreciable alteration of vividness and hue of color inherent to a photographic subject, even in cases where numerous pixels having hue characteristic of the subject are selected as the color cast calculation pixel group. In the event that there is no color shift of the light source indicated in light source information, i.e. where the color of the light source is pure white, it is preferable to execute the standard white balance adjustment process in which processing amount proportion k does not vary depending on hue H.

Rather than using the same conditions (saturation threshold value Sth, luminance threshold value Lth) as those for the standard white balance adjustment process shown in FIGS. 12(a)-12(c) as conditions for selecting the color cast calculation pixel group, it may be acceptable to instead use conditions adjusted depending on the color shift of the light source, shown in FIGS. 15(a)-15(c). By so doing, color cast occurring as a result of color shift of the light source can be minimized more accurately.

Figure 17:
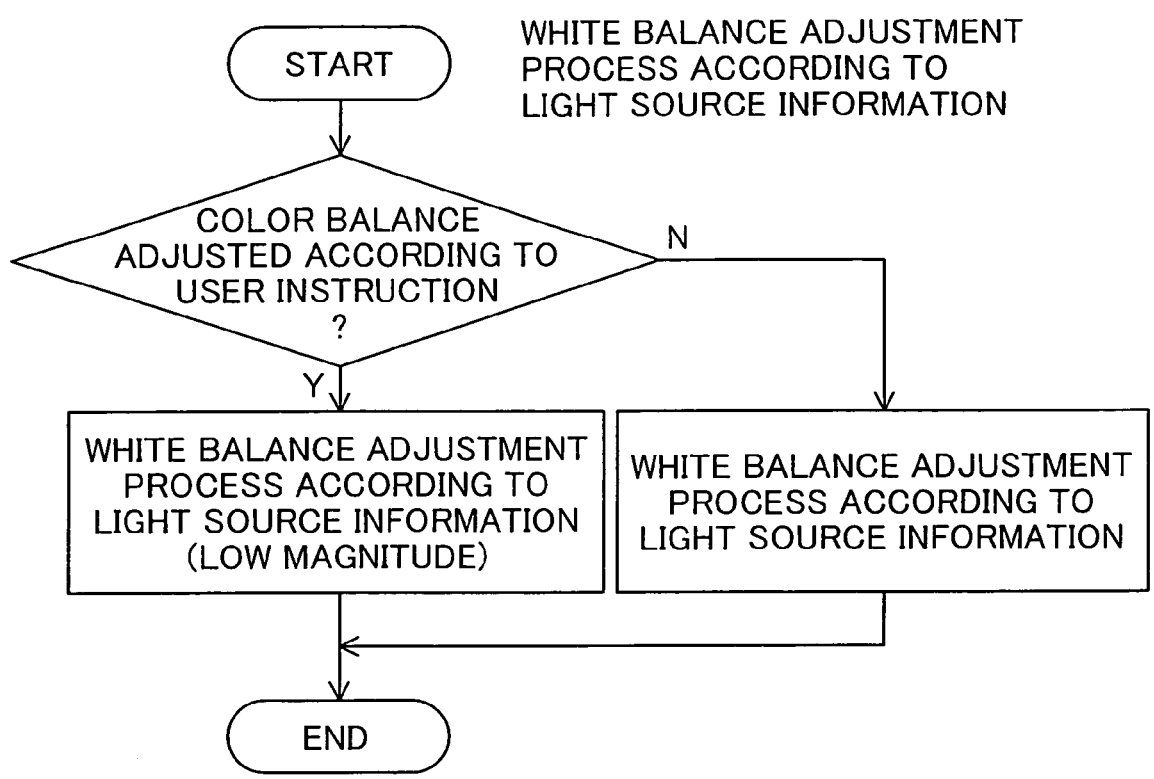
FIG. 17 is a flowchart showing another example of an image quality adjustment process.

E6. Embodiment of Image quality Adjustment Process in Case of Established Light Source Information FIG. 17 is a flowchart showing another example of an image quality adjustment process. This processing sequence can be used in place of Step S420 shown in FIG. 10 (white balance adjustment process according to light source information); it differs from the example of FIG. 10 in that the magnitude of white balance adjustment processing varies depending on the result of a determination as to whether the color balance of image data has been adjusted according to user instruction.

In order to determine whether color balance of image data has been adjusted according to user instruction, it is possible, for example, to use the "white balance information" (FIG. 5) in the image generation record information described previously. Where the light source information (light source color shift) setting has been made by the user, in the image generating device there will be generated image data whose color balance is adjusted according to the color balance of the user-selected light source color balance. In this case, "Manual Set" will be set as the parameter value of light source information. Where light source information has been set automatically rather than by the user, in the image generating device the color balance of the image data will be adjusted automatically. In this case, "Auto Set" will be set as the parameter value.

In this embodiment, in the event that the white balance information is "Manual Set", i.e. where color balance of image data has been adjusted according to user instruction, CPU 41 (FIG. 8) executes the white balance adjustment process at a lower magnitude than in the case of automatic adjustment. In the case of "Manual Set", it is often the case that color balance of image data has been adjusted to a color balance that agrees with the preferences of the user. In such instances, when color balance is adjusted by means of the white balance adjustment process, in some cases the resultant color balance will differ from user preference. Accordingly, by adjusting the magnitude of white balance adjustment processing to a lower level in instances of "Manual Set", it is possible to avoid appreciable alteration of color balance set according to user preference.

This adjustment of white balance adjustment process magnitude may be accomplished, for example, as shown in FIGS. 14(a) and 14(b), by increasing the processing amount proportion k, or by adjusting the range of conditions for selecting a color cast calculation area (saturation threshold value Sth, luminance threshold value Lth). In either case, it is preferable to adjust the magnitude such that, for a given image, the amount of white balance adjustment processing in the case of "Manual Set" is smaller than the processing amount in the case of "Auto Set." An arrangement whereby the magnitude is set to zero in instances of "Manual Set", i.e. whereby in instances of "Manual Set" the white balance adjustment process is not executed at all, may be acceptable as well.

Figure 18:
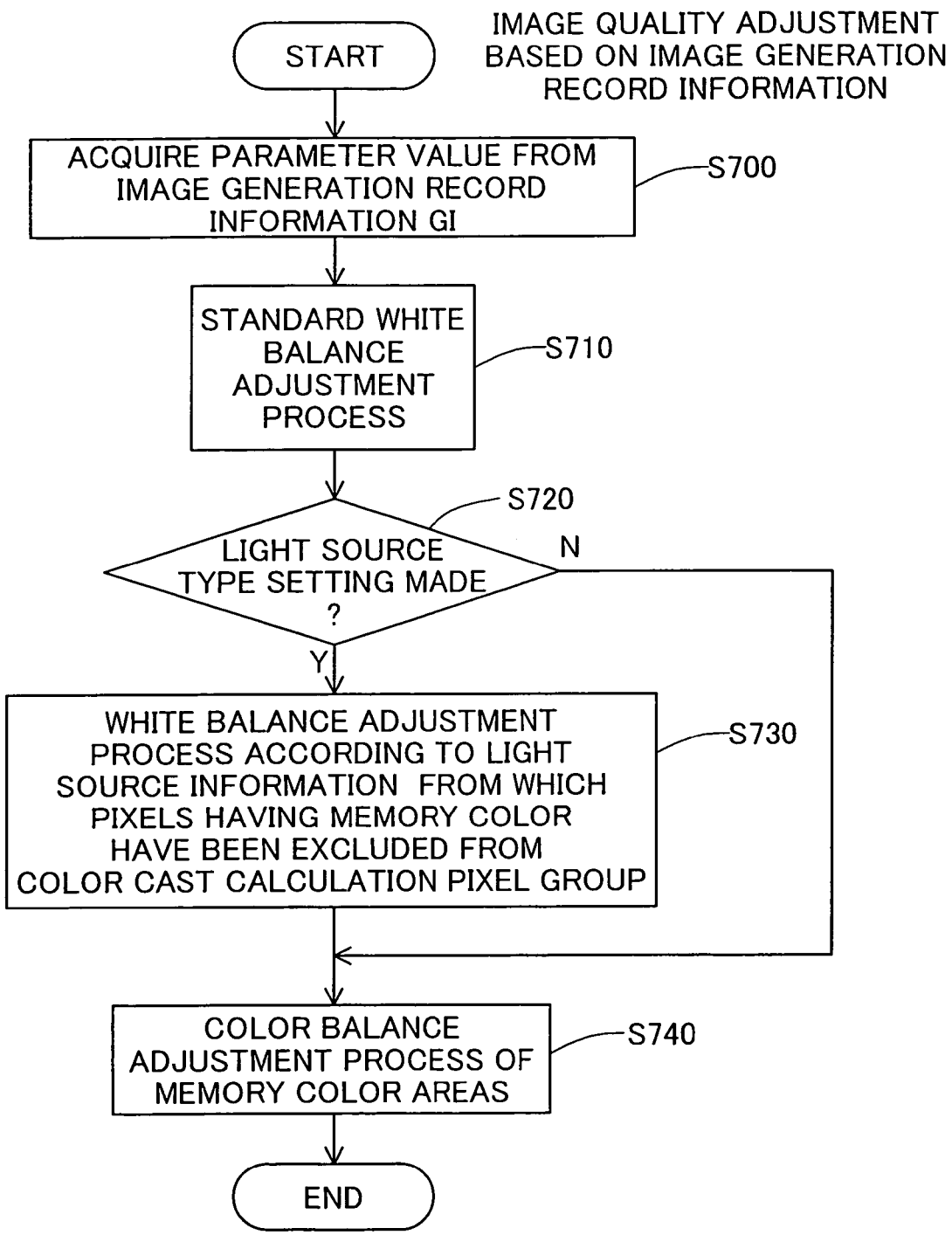
FIG. 18 is a flowchart showing yet another example of an image quality adjustment process.

E7. Another Embodiment of Image quality Adjustment Process Based on Image Generation Record Information FIG. 18 is a flowchart showing yet another embodiment of an image quality adjustment process based on image generation record information (corresponding to Step S240 in FIG. 9). A significant difference from the embodiment in FIG. 10 is that pixels of hue approximating pre-established memory color (memory color pixels) are excluded from the color cast calculation pixel group for the white balance adjustment process according to light source type. In this embodiment, regardless of whether a light source type setting has been made, CPU 41 first executes the standard white balance adjustment process (Step S710). Then, in the event that a light source type setting has been made (Step S720: Y), it further executes a white balance adjustment process according to the light source information (Step S740). During this process, memory color pixels (described later) are excluded from the color cast calculation pixel group. Finally, regardless of whether light source information has been set, a color balance adjustment process for the memory color pixels is executed (Step S740).

Memory color refers to color characteristic of an area which is particularly noticeable to the human eye. If an area composed of pixels having such memory color (memory color area) can be reproduced with a color balance that the user finds pleasing, the user will be able to recognize the image as being an image of high quality. Examples of such highly noticeable areas are a human skin tone area in a portrait image, or a blue area of sky or green area of mountains in a landscape image. As the method for selecting memory color, there may be employed, for example, a method whereby pixels whose hue lies within a predetermined range are selected. For example, pixels having hue within a range of 0°-40° may be used.

Incidentally, where light source color shift is particularly strong, i.e. where light source color has high saturation, color in memory color areas having characteristic, non-achromatic color balance may become shifted to the hue of the light source as well. In such instances, the pixels of the memory color area will be selected as the color cast calculation pixel group. If the white balance adjustment process is carried out on the basis of color cast calculated in this manner, color vividness and hue of memory color areas may be significantly altered, resulting in some instances in an inability to adequately improve image quality.

In this embodiment, in the event that a light source type setting has been made, CPU 41 calculates color cast amount from a pixel group that excludes pixels having pre-established memory color, and executes the white balance adjustment process according to the color cast amount derived thereby, and the light source information. Thus, since the effect on color cast amount of color balance characteristic to memory color areas is minimal, it is possible to avoid appreciable alteration of color balance of memory color areas. A method similar to that described in the preceding embodiments may be used as the processing method for the white balance adjustment process according to light source information. The difference between the white balance adjustment process according to light source information in this embodiment and the white balance adjustment process according to light source information in the preceding embodiments is the exclusion of memory color pixels from the color cast calculation pixel group. Further, in this embodiment, the standard white balance adjustment process is executed (Step S710) prior to selection of memory color pixels. Thus, the effects of light source color shift are reduced, so that memory color pixels can be selected more accurately.

In this embodiment, finally, a color balance adjustment process for memory color areas is executed (Step S740). This process is one that is executed exclusively on pixels of memory color areas; the purpose of the process is to adjust color balance of memory color areas so as to approximate a predetermined target color pleasing to the user. Since this color balance adjustment is similar to the white balance adjustment process described previously, a process similar to the process shown in FIG. 11 is executed. There are two differences between this color balance adjustment process and the white balance adjustment process shown in FIG. 11. One is that memory color pixels are selected as the color cast calculation pixel group. The other is that differences between average tone values of each color in the memory color pixel group and tone values of each color of the target color are used as color cast amounts. Equation 3 below is a computational equation for calculating color cast amounts $\Delta R$, $\Delta G$, $\Delta B$ in this color balance adjustment process.

$$\Delta R = Rave - Rtgt$$

$$\Delta G = Gave - Gtgt$$

$$\Delta B = Bave - Btgt$$

Rave: average value of R in pixel group for color cast calculation
Gave: average value of G in pixel group for color cast calculation
Bave: average value of B in pixel group for color cast calculation
Rtgt: R of target color
Gtgt: G of target color
Btgt: B of target color Where, as shown by Equation 3, differences between average tone values of RGB in memory color areas and tone values of target color are used as color cast amounts in order to carry out tone value adjustment so as to minimize resultant color cast amounts, it becomes possible to bring color balance of memory color areas into approximation with a target color pleasing to the user.

F. Arrangement of Image Output System Employing Image Data Processing Device

Figure 19:
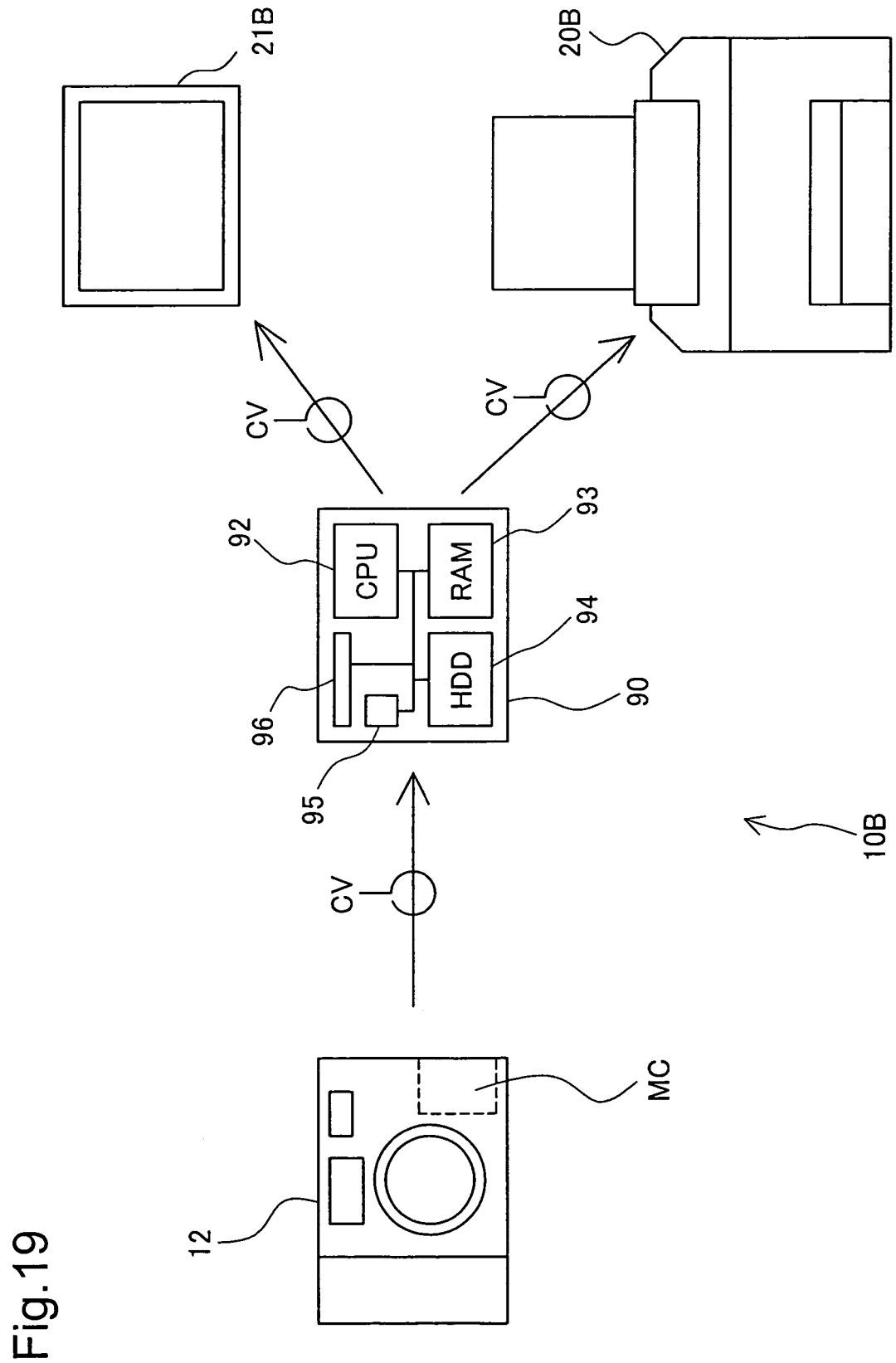
FIG. 19 illustrates an example of an image output system.

FIG. 19 is an explanatory diagram showing an example of an image output system in which an image data processing device may be implemented by way of an embodiment of the invention. Image output system 10B comprises a digital still camera 12 as an image generating device for generating image files; a computer 90 for executing an image quality adjustment process based on an image file; and a printer 20B as an image output device for outputting images. Computer 90 is computer of commonly used type, and functions as an image data processing device. As the image output device, a CRT display, LCD display, or other monitor 21B, or a projector or the like may be used instead of printer 20B. In the following description, it is assumed that printer 20B is used as the image output device. This embodiment differs from the image output system example described previously (FIG. 1) in that the image data processing device comprising the image quality adjuster, and the image output device comprising the image output unit, are constituted independently. The computer serving as the image data processing device and the printer comprising the image output unit can be termed an "output device" in the broad sense.

An image file created in digital still camera 12 is transferred to computer 90 via a cable CV, or by directly inserting into computer 90 a memory card MC having the image file stored thereon. Computer 90 executes an image quality adjustment process on the image data, based on the read out image file. The image data produced by the image quality adjustment process is transferred to printer 20B via cable CV, and output by printer 20B.

Computer 90 comprises a CPU 92 for executing a program that realizes the aforementioned image quality adjustment process; RAM 93 for temporarily storing results of operations by CPU 92, image data, and the like; and a hard disk drive (HDD) 94 for storing data needed for the image quality adjustment process, such as the image quality adjustment process program, hue table, and the like. CPU 92, RAM 93, and HDD 94 function as an image quality adjuster. Computer 90 further comprises a memory card slot 96 for installing a memory card MC; and an input/output terminal 95 for connecting a connector cable from digital still camera 12 or the like.

An image file GF generated by a digital still camera 12 is supplied to computer 90 via a cable, or via a memory card MC. When an image data processing application program—either an image retouching application program or a printer driver—is run under user control, CPU 92 executes an image processing routine (FIG. 9) to process the read in image file GF. Alternatively, the image data processing application program may be set to start up automatically when a memory card MC is inserted into memory card slot 96, or when connection of a digital still camera 12 to input/output terminal 95 via a cable is detected.

Image data processed by CPU 92, rather than being output in Step S250 of the image processing routine (FIG. 9), is instead transferred to an image output device, for example, printer 20B, whereupon the image output device receiving the image data executes image output.

In this embodiment, since image processing is carried out by an image quality adjuster provided to computer 90, it is possible to use an image output device that does not have an image quality adjuster. Where the image output device is provided with an image quality adjuster, image data may be output to the image output device without being subjected to image processing on computer 90, and image processing may instead carried out by the image quality adjuster of the image output device.

In the embodiments described hereinabove, using light source information for an image whose color is shifted due to color shift of the light source, appropriate image quality adjustment may be carried out automatically, so that output results of high image quality are obtained.

G. Variations

The invention is not limited to the embodiments and embodiments set forth hereinabove, and may be reduced to practice in various ways without departing from the scope and spirit thereof, such as the following variations, for example.

G1. Variation 1

In the embodiments described hereinabove, type of light source is used as light source information relating to color shift of a light source; however, this information is not limited to type of light source, and may consist of any information enabling determination of the hue of a light source. For example, light source hue per se, or the spectral distribution of a light source, color temperature of a light source, or the like may be used as light source information.

G2. Variation 2

In the embodiments described hereinabove, where the type of light source has been set by the user in the image generating device, the color balance of the generated image data is adjusted according to the color balance of the set light source; however, there may also be used an image generating device that generates image data without using light source information set by the user. In preferred practice, image data generated by an image generating device of this kind will be subjected to white balance adjustment process at normal magnitude, according to light source information set by the user. By so doing, color cast due to light source color shift can be minimized appropriately. In any event, if it is determined that the color balance of image data has been adjusted according to user instruction, it is preferable to execute the white balance adjustment process at lower magnitude than if this determination is not made. By so doing, appreciable alteration of user-preferred color balance can be avoided, and color cast can be minimized appropriately with reference to color shift of the light source.

G3. Variation 3

The description in the preceding examples take an Exif format file as a specific example of the image file GF, but the format of the image file pertaining to the present invention is not limited to this. That is, any image file containing image data generated by an image generating device, and image generation record information GI describing shooting conditions at the time of generation of the image data would be acceptable. With such a file, image quality of image data generated by an image generating device can be appropriately adjusted automatically and output from an output device.

G4. Variation 4

In the preceding examples, the description takes the example of a case where image data GD and image generation record information GI are contained in the same image file GF, but image data GD and image generation record information GI need not necessarily be stored within the same file. That is, it is sufficient for image data GD and image generation record information GI to be associated with each other; for example, it would be acceptable to generate associating data that associates image data GD with image generation record information GI; store one or several sets of image data and image generation record information GI in independent files; and refer to the associated image generation record information GI when processing the image data GD. This is because, in this case, although the image data GD and image generation record information GI are stored in separate files, at the point in time of image processing which utilizes the image generation record information GI, the image data GD and image generation record information GI are in inseparably linked, and thus function substantially the same as if they were stored in the same file. That is, the term image file GF in the embodiments includes files of a form wherein image data GD and image generation record information GI are associated, at least at the point in time that image processing takes place. Also included are motion video files stored on optical disk media such as CD-ROM, CD-R, DVD-ROM, DVD-RAM, and the like.

INDUSTRIAL APPLICABILITY

The invention is applicable to printers, digital cameras, and computers having image processing functionality.

The invention claimed is:

1. An image processing device for processing image data using image data and image generation record information that is associated with the image data and that includes at least information relating to shooting conditions at the time of generation of the image data, the image processing device comprising:
   an image quality adjuster that, if the image generation record information contains light source information relating to color shift of a light source at the time of generation of the image data, is able to execute white balance adjustment process of the image data based on color of the light source obtained using the light source information, the image quality adjuster adjusting magnitude of the white balance adjustment process based on hue of the light source,
   wherein the white balance adjustment process includes:
   (i) a process of analyzing pixel values of a part of pixels making up the image data to determine an amount of color cast indicating deviation of hue of the image data from gray;
   (ii) a process of determining an amount of the white balance adjustment process based on the amount of color cast; and
   (iii) a process of executing the white balance adjustment process in accordance with the determined amount;
   wherein the magnitude of the white balance adjustment process is adjusted by adjusting, based on the hue of the light source, a pre-selected processing parameter used in at least one of the processes (i) and (ii), and
   wherein the image quality adjuster establishes a condition for selecting pixels for the analysis from among all pixels making up the image data, the condition including that saturation of a pixel is equal to or less than a saturation threshold value, the saturation threshold value being large in a case where hue of the pixel is within a partial range of hue compared to a case where the hue of the pixel is outside the partial range of hue, the partial range of hue including the hue of the light source obtained using the light source information.

2. An image processing device according to claim 1 wherein the image quality adjuster is able to determine whether the color balance of the image data was adjusted according to user instruction at the time of generation of the image data, and
   if determined to have been adjusted according to user instruction, the image quality adjuster executes the white balance adjustment process using a lower magnitude than if the determination had not been made.

3. An image processing device for processing image data using image data and image generation record information that is associated with the image data and that includes at least information relating to shooting conditions at the time of generation of the image data, the image processing device comprising:

an image quality adjuster that, if the image generation record information contains light source information relating to color shift of a light source at the time of generation of the image data, is able to execute white balance adjustment process of the image data based on color of the light source obtained using the light source information, the image quality adjuster adjusting magnitude of the white balance adjustment process based on hue of the light source, wherein the white balance adjustment process includes:

(i) a process of analyzing pixel values of a part of pixels making up the image data to determine an amount of color cast indicating deviation of hue of the image data from gray;

(ii) a process of determining an amount of the white balance adjustment process based on the amount of color cast; and (iii) a process of executing the white balance adjustment process in accordance with the determined amount;

wherein the magnitude of the white balance adjustment process is adjusted by adjusting, based on the hue of the light source, a pre-selected processing parameter used in at least one of the processes (i) and (ii), and wherein the image quality adjuster subjects a process parameter representing a proportion of an amount of the white balance adjustment process to an amount of the color cast, to cause adjustment in such a way that the process parameter is large in a case where a shifted hue in the image data is within a partial range of hue compared to a case where the shifted hue in the image data is outside the partial range of hue, in order to adjust the magnitude of the white balance adjustment process, the partial range of hue including the hue of the light source obtained using the light source information.

4. An image processing device according to claim 3 wherein the image quality adjuster selects for the analysis pixels approximating achromatic color in the image data.

5. An image processing device according to claim 3 wherein the image quality adjuster selects for the analysis pixels excluding pixels of predetermined hue.

6. An output device for outputting an image using image data and image generation record information that is associated with the image data and that includes at least information relating to shooting conditions at the time of generation of the image data, the output device comprising:

an image quality adjuster that, if the image generation record information contains light source information relating to color shift of a light source at the time of generation of the image data, is able to execute white balance adjustment process of the image data based on color of the light source obtained using the light source information, the image quality adjuster adjusting magnitude of the white balance adjustment process based on hue of the light source; and an image output unit for outputting an image according to the image quality-adjusted image data, wherein the white balance adjustment process includes:

(i) a process of analyzing pixel values of a part of pixels making up the image data to determine an amount of color cast indicating deviation of hue of the image data from gray;

(ii) a process of determining an amount of the white balance adjustment process based on the amount of color cast; and (iii) a process of executing the white balance adjustment process in accordance with the determined amount;

wherein the magnitude of the white balance adjustment process is adjusted by adjusting, based on the hue of the light source, a pre-selected processing parameter used in at least one of the processes (i) and (ii), and wherein the image quality adjuster establishes a condition for selecting pixels for the analysis from among all pixels making up the image data, the condition including that saturation of a pixel is equal to or less than a saturation threshold value, the saturation threshold value being large in a case where hue of the pixel is within a partial range of hue compared to a case where the hue of the pixel is outside the partial range of hue, the partial range of hue including the hue of the light source obtained using the light source information.

7. An image processing method for processing image data using image data and image generation record information that is associated with the image data and that includes at least information relating to shooting conditions at the time of generation of the image data, the method comprising the step of:

if the image generation record information contains light source information relating to color shift of a light source at the time of generation of the image data, executing white balance adjustment process of the image data based on color of the light source obtained using the light source information, the executing including adjusting magnitude of the white balance adjustment process based on hue of the light source, wherein the white balance adjustment process includes:

(i) a process of analyzing pixel values of a part of pixels making up the image data to determine an amount of color cast indicating deviation of hue of the image data from gray;

(ii) a process of determining an amount of the white balance adjustment process based on the amount of color cast; and (iii) a process of executing the white balance adjustment process in accordance with the determined amount;

wherein the magnitude of the white balance adjustment process is adjusted by adjusting, based on the hue of the light source, a pre-selected processing parameter used in at least one of the processes (i) and (ii), and wherein the executing establishes a condition for selecting pixels for the analysis from among all pixels making up the image data, the condition including that saturation of a pixel is equal to or less than a saturation threshold value, the saturation threshold value being large in a case where hue of the pixel is within a partial range of hue compared to a case where the hue of the pixel is outside the partial range of hue, the partial range of hue including the hue of the light source obtained using the light source information.

8. A computer program stored on a computer readable medium for causing a computer to execute processing of image data using image data and image generation record information that is associated with the image data and that includes at least information relating to shooting conditions at the time of generation of the image data, the computer program causing a computer to execute a function that, if the image generation record information contains light source information relating to color shift of a light source at the time of generation of the image data, is able to execute white balance adjustment process of the image data based on color of the light source obtained using the light source information, the function causing the computer to adjust magnitude of the white balance adjustment process based on hue of the light source, wherein the white balance adjustment process includes:

(i) a process of analyzing pixel values of a part of pixels making up the image data to determine an amount of color cast indicating deviation of hue of the image data from gray;

(ii) a process of determining an amount of the white balance adjustment process based on the amount of color cast; and (iii) a process of executing the white balance adjustment process in accordance with the determined amount;

wherein the magnitude of the white balance adjustment process is adjusted by adjusting, based on the hue of the light source, a pre-selected processing parameter used in at least one of the processes (i) and (ii), and wherein the function causes the computer to establish a condition for selecting pixels for the analysis from among all pixels making up the image data, the condition including that saturation of a pixel is equal to or less than a saturation threshold value, the saturation threshold value being large in a case where hue of the pixel is within a partial range of hue compared to a case where the hue of the pixel is outside the partial range of hue, the partial range of hue including the hue of the light source obtained using the light source information.

* * * * *